(12) United States Patent
Murakawa et al.

(10) Patent No.: US 6,637,984 B2
(45) Date of Patent: Oct. 28, 2003

(54) HEAT ABSORBING THROW-AWAY TIP AND HEAT ABSORBING THROW-AWAY TOOL USING THE THROW-AWAY TIP

(76) Inventors: Masao Murakawa, 4-5, Shinshiraoka 3-chome, Shiraoka-machi, Minamisaitama-gun, Saitama 349-0212 (JP); Masahiko Jin, 260-9, Marubayashi, Nogi-machi, Shimotsuga-gun, Tochigi 329-0111 (JP)

( * ) Notice: Subject to any disclaimer, the term of this patent is extended or adjusted under 35 U.S.C. 154(b) by 80 days.

(21) Appl. No.: 10/031,004
(22) PCT Filed: Mar. 2, 2001
(86) PCT No.: PCT/JP01/01621
§ 371 (c)(1),
(2), (4) Date: Oct. 29, 2001
(87) PCT Pub. No.: WO01/64376
PCT Pub. Date: Sep. 7, 2001

(65) Prior Publication Data
US 2002/0106250 A1 Aug. 8, 2002

(30) Foreign Application Priority Data
Mar. 3, 2000 (JP) .......................................... 2000-59249

(51) Int. Cl.[7] .............................. B23P 15/28; B23P 1/00; B23P 5/00
(52) U.S. Cl. .......................... 407/11; 407/113; 82/900
(58) Field of Search ..................... 407/11, 113; 408/56; 82/900

(56) References Cited

U.S. PATENT DOCUMENTS

| 3,664,412 A | * | 5/1972 | Zerkle ..................... 165/104.26 |
| 3,889,520 A | * | 6/1975 | Stoferle et al. .............. 73/37.5 |
| 5,761,974 A | * | 6/1998 | Wang et al. .................. 82/1.11 |

FOREIGN PATENT DOCUMENTS

| JP | 56-69007 A | 6/1981 |
| JP | 61-192402 A | 8/1986 |
| JP | 3-33005 U | 4/1991 |
| JP | 10-58220 | 3/1998 |
| WO | 95/29030 | 11/1995 |

* cited by examiner

*Primary Examiner*—A. L. Wellington
*Assistant Examiner*—Brian D. Walsh
(74) *Attorney, Agent, or Firm*—Michael J. Striker

(57) ABSTRACT

An indexable insert having a heat absorbing performance, and an indexable tool using the same. The indexable insert is attached, when used, to a shank or holder having fluid inlet and outlet passages. The heat absorption indexable insert comprises: a corridor-shaped cooling passage disposed inside of a plurality of corners and circulating the vicinities of the individual corners sequentially; and a connecting passage arranged in an end portion region of the cooling passage so as to communicate with the inlet passage and the outlet passage even when any corner is used.

13 Claims, 19 Drawing Sheets

Fig.7-A
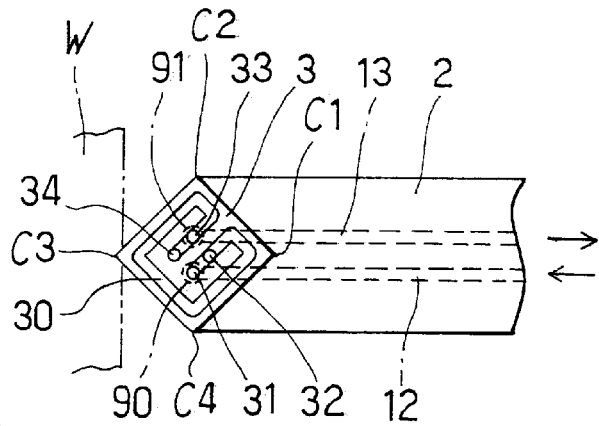
Fig.7-B
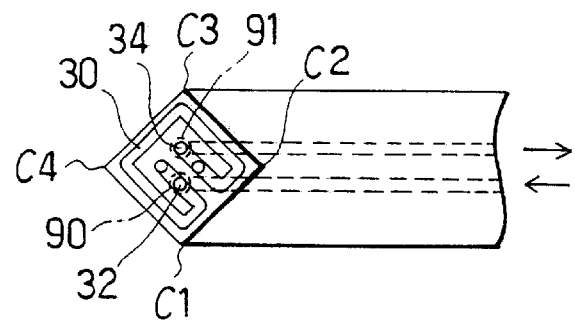
Fig.7-C
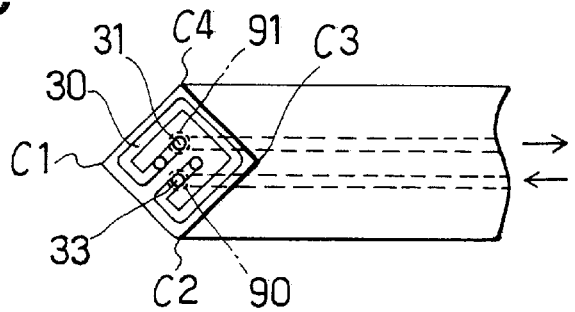
Fig.7-D
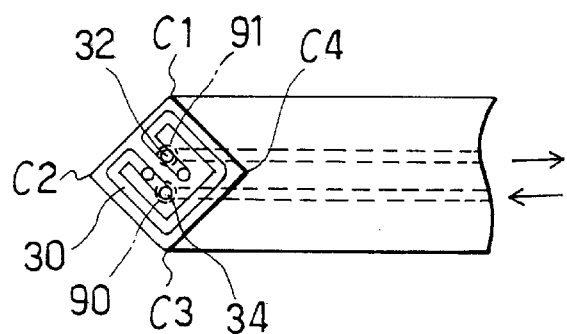

Fig.8
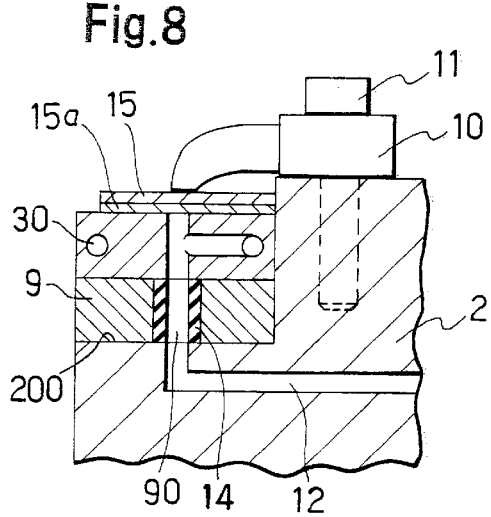
Fig.9
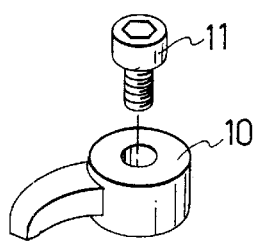
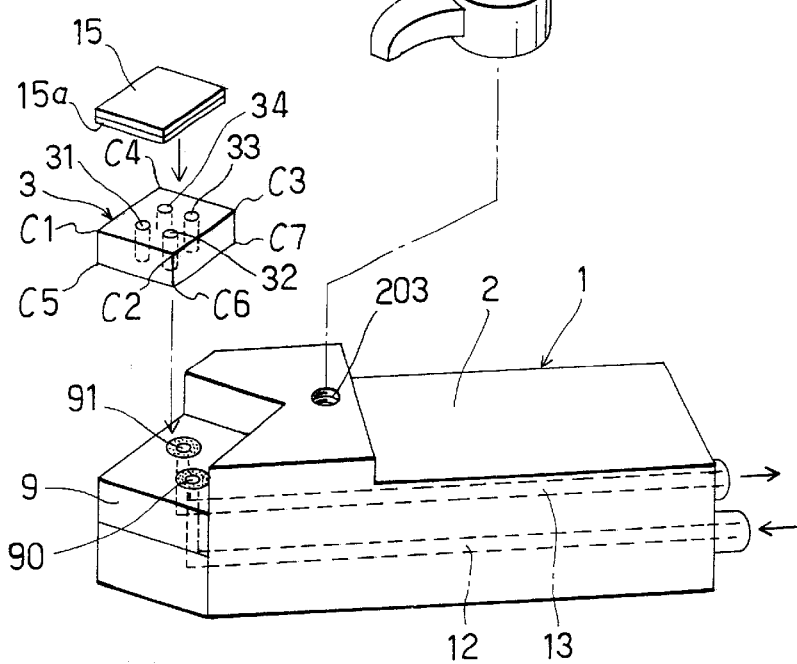
Fig.10    Fig.11
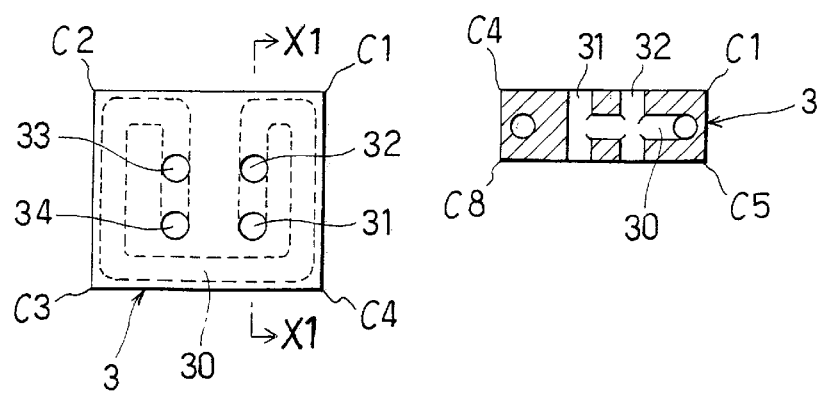

Fig.15-A
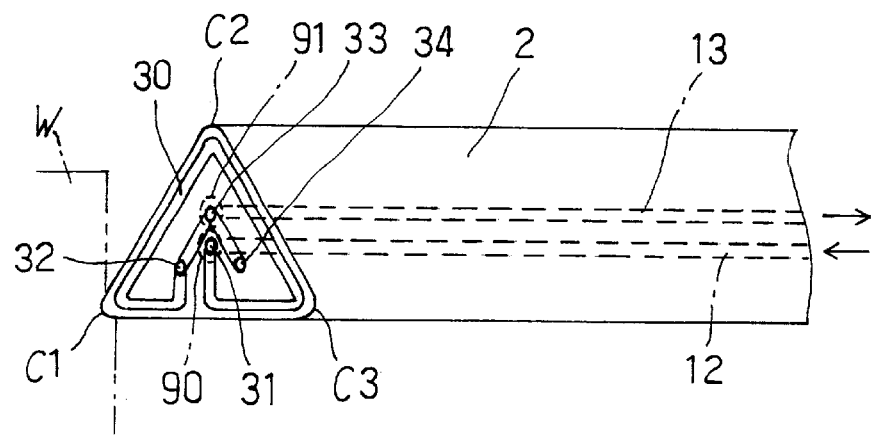
Fig.15-B
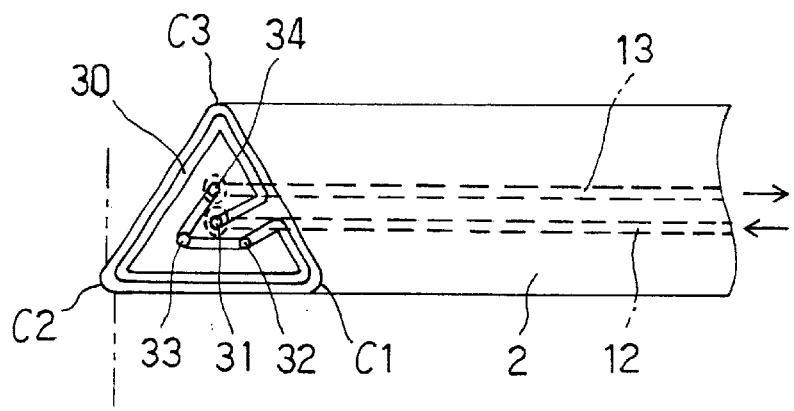
Fig.15-C
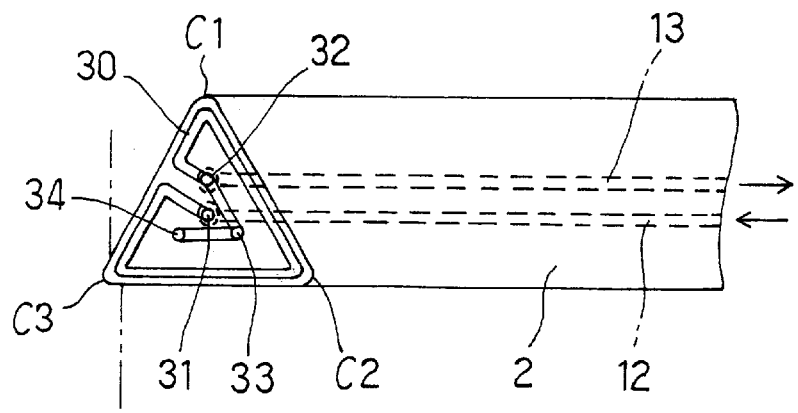

Fig. 19
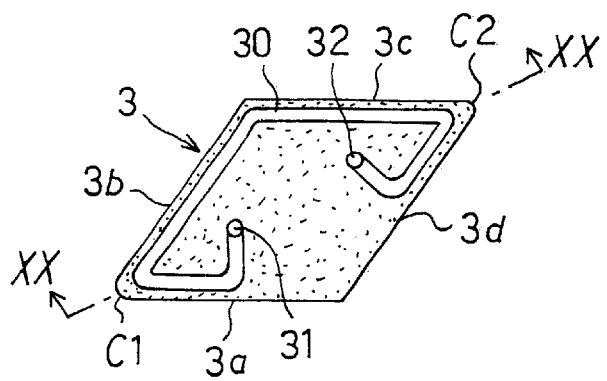
Fig. 20
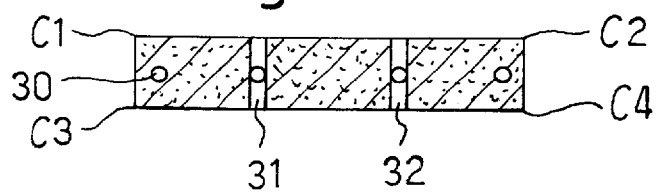
Fig. 21-A
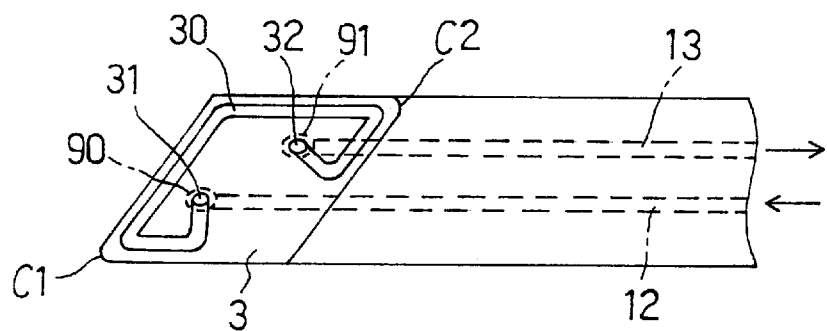
Fig. 21-B
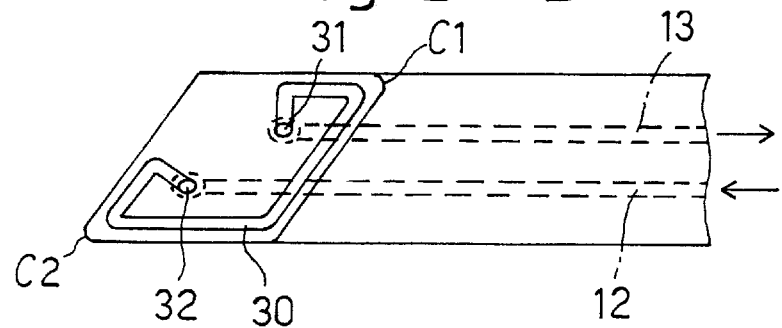

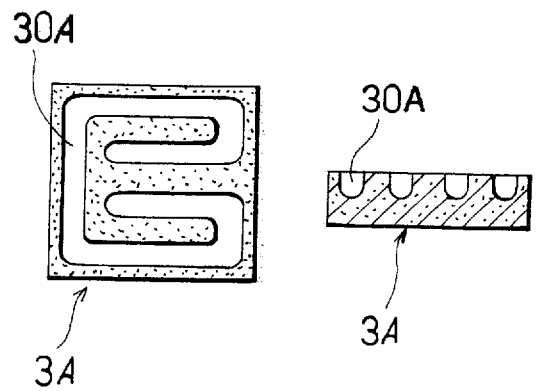
Fig.22-A  Fig.22-B
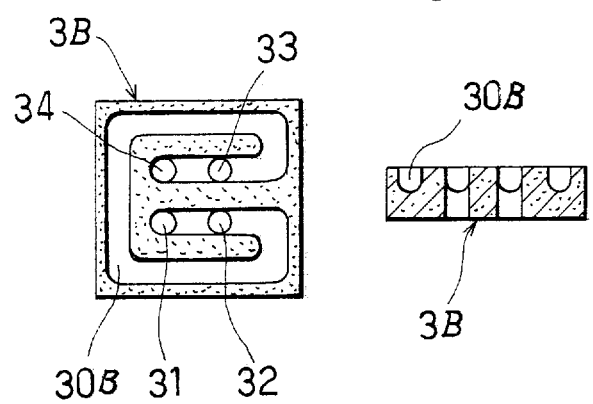
Fig.23-A  Fig.23-B
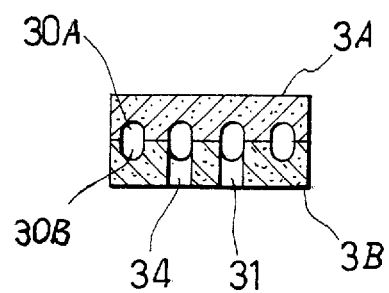
Fig.24

Fig.41-A
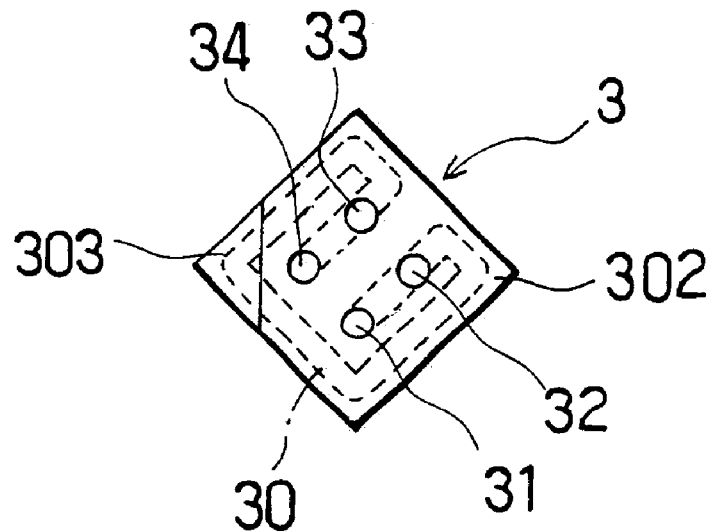
Fig.41-B
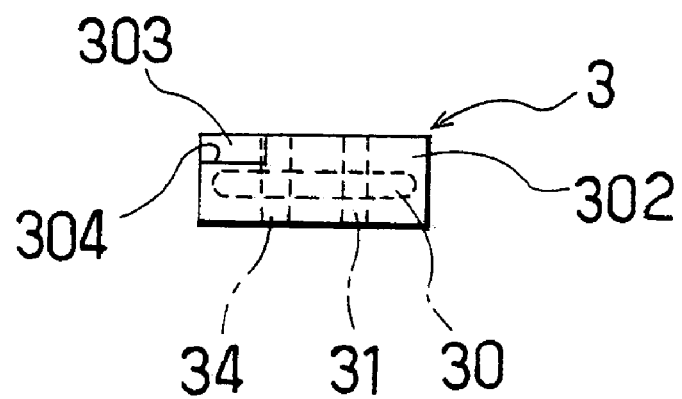

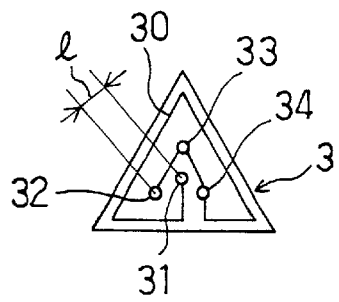
Fig. 45-A
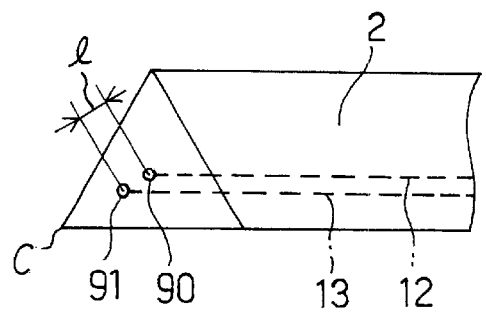
Fig. 45-B
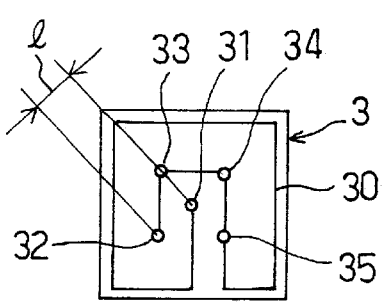
Fig. 46-A
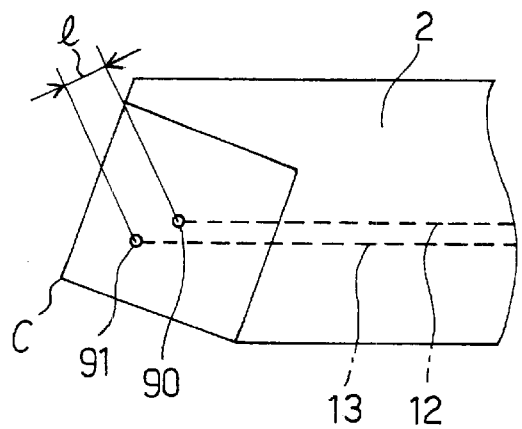
Fig. 46-B
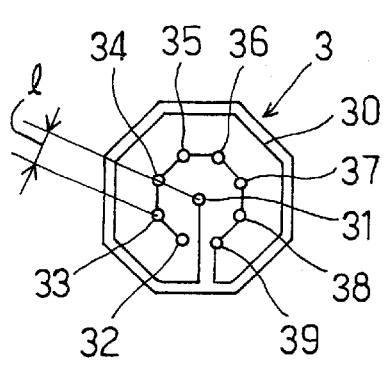
Fig. 47-A
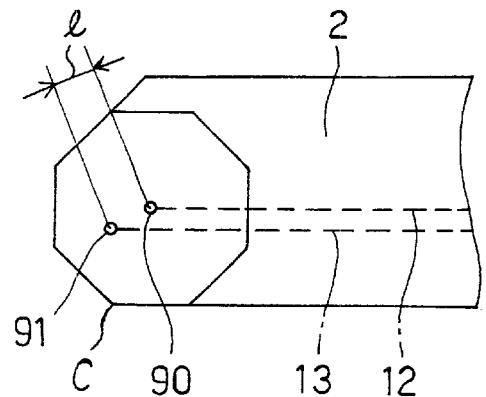
Fig. 47-B

HEAT ABSORBING THROW-AWAY TIP AND HEAT ABSORBING THROW-AWAY TOOL USING THE THROW-AWAY TIP

TECHNICAL FIELD

The present invention relates to an indexable insert, especially an indexable insert having a heat absorbing performance, and a heat absorption indexable tool using the insert.

BACKGROUND ART

In the prior art, cutting oil has been generally used in a cutting work of a metal. Recently, however, it is desired from the view point of the environmental problem or the production cost to reduce the cutting oil, as might otherwise be consumed in a large quantity. However, the cutting oil has a high cooling effect, and it is directly connected to a rise in the tool cost and a drop in the working efficiency to stop the use of the cutting oil. Therefore, there has been demanded the development of a cooling method or a cutting method in place of the method using the cutting oil.

As this counter-measure, there has been proposed in the prior art the method of eliminating the cutting heat and lubricating by convecting a small amount of cutting liquid and/or gas to a cutting point, such as the MQL cutting method, the cold-air blast cutting method or the nitrogen blast cutting method using vegetable oil.

However, these methods are proper for the aspect of the environmental problem but still have various problems unsolved. More specifically, the case of the MQL cutting method cannot be said a complete dry cutting method, and has a problem that the cutting conditions for its effect are limited to the cutting mode of the reach of sufficient mist. The cold-air blast cutting method is required to have an expensive apparatus for establishing a cold wind of −40° C. and to have a frost resistance at the feed circuit and the blow-off outlet. Thus, the cold-air blast cutting method is still troubled in that it takes excess costs and troubles and in that the wind noise by the cold-wind blast causes the pollution problem.

As another measure, there has been proposed a method for cooling the tool. In WO95/29030, for example, there has been proposed a drill, in which a passage for a cooling medium to pass through is formed in the drill shaft. In Unexamined Published Japanese Patent Application No. 10-58220, it has been proposed to form a passage in an end mill for passing a cooling liquid therethrough.

In all of these methods, a shaft-shaped solid tool is cooled always at a fixed position, so that the methods can be easily applied. In the indexable insert used as most generally as the cutting tool, that is, in the insert to be discarded when the cutting edges (the cutting corners) are discarded when the they come to the end of life, however, the cutting edges are present in plurality at a plurality of discrete portions so that they are sequentially changed as they are used. Therefore, the portions to be cooled are changed to make it difficult to apply the aforementioned methods, and no notable proposal has been made in the prior art.

DISCLOSURE OF THE INVENTION

The present invention has been conceived to solve the above-specified problems and has an object to provide a heat absorption indexable insert which can exhibit an effect of tool wear resistance similar to that of the cutting oil using case in a dry cutting operation, which can absorb a plurality of cutting edges (or corners) at discrete positions efficiently, and which can be easily manufactured with a simple structure, and an indexable tool to which the indexable insert is applied.

In order to achieve the above-specified object, according to the present invention, in an indexable tool to be attached, when used, to a shank or holder having fluid inlet and outlet passages, there is provided a heat absorption indexable insert comprising: a corridor-shaped cooling passage disposed inside of a plurality of corners and circulating the vicinities of the individual corners sequentially; and a connecting passage arranged in an end portion region of said cooling passage so as to communicate with said inlet passage and said outlet passage even when any corner is used.

According to this construction, the heat absorption rate can be raised no matter what corner might be used as any of cutting edges, to absorb and release the cutting heat efficiently from the inside of the insert. Without using the cutting oil, therefore, the environment can be satisfied, and the heat release rate of the cutting heat is increased to provide an effect of tool wear resistance similar to that of the wet method.

According to a first mode, said cooling passage and said connecting passage are individually shaped to have the closed sectional shapes, i.e., or the holes. This mode can be applied to the case in which the indexable insert is of a positive type or of a negative type. In the case of the positive type, the connecting passage is opened only in the lower face of the insert. In the case of the negative type, the connecting passage is extended through the insert in the thickness direction and is opened in the upper and lower faces of the insert.

According to this construction, the cutting heat of the cutting edge can be efficiently absorbed no matter what type the indexable insert might take. Moreover, the cooling passage and the connecting passage are present as cavities in the insert to provide an advantage that it is easy to do the work of crushing the used heat absorption indexable insert for reuse. Where the connecting passage is extended through the insert in the thickness direction, the heat can be absorbed from all the corners of the surface and back of the insert merely by laying the seal member on the heat absorption indexable insert.

In a second mode, said cooling passage and said connecting passage are individually formed into a groove-shaped section having openings in the lower face of the insert. In this case, the indexable insert is of the positive type.

The representative construction for enabling the cooling passage and the connecting passage to communicate with the inlet passage and the outlet passage selectively no matter what corner might be used will be enumerated, as follows.

1) The single connecting passage is disposed at the center of a polygonal indexable insert; connecting passages are disposed on straight lines joining the individual corners to be used as cutting edges and said center and at positions equidistant from the center; and the center connecting passage communicates with one end portion of the cooling passage whereas the remaining connecting passages communicate with the other end portion of the cooling passage.

In this case, the center connecting passage functions as the inlet passage at all times whereas the other connecting passages around the center one function as the outlet passages.

2) The connecting passages are disposed on diagonal lines joining the corners to be used as the cutting edges of a polygonal indexable insert and at positions equidistant from the insert center, and the connecting passages belonging to one side region halved from the center of the sides of the insert communicate with one end portion of the cooling passage whereas the connecting passages belonging to the other side region communicate with the other end portion of the cooling passage. In this case, one of the connecting passages belonging to one of the regions functions as an inlet passage whereas the connecting passages belonging to the other region function as an outlet passage.

Where these passage constructions 1) and 2) are adopted, the inlet passage and the outlet passage on the shank or holder side may be formed to have the spacing and direction identical to those of said connecting passages. Thus, when the corner to be used of the heat absorption indexable insert is changed, the cooling passage is automatically caused by the connecting passages to communicate with the inlet passage and the outlet passage. No matter what corner might be used as the cutting point, therefore, it is possible to provide an indexable tool which can be easily used to absorb the heat from the cutting edges. In the case of the passage construction 2), no connecting passage is formed at the center of the insert. Therefore, it is possible to make the number of connecting passages smaller than that of the case 1), and to open a hole at the insert center for inserting the fixing pin thereby to find a suitable application to the screw-on type.

In the indexable insert thus far described, the cooling passage and the connecting passages may preferably be formed by any of the following methods.

In the first mode, the cooling passage and the connecting passages are prepared by laminating and joining two halved inserts (e.g., the tentatively or completely sintered compacts) having grooves.

In the second mode, the cooling passage and the connecting passages are prepared by causing a core having a shape corresponding thereto to disappear at the time of sintering a compact.

In the third mode, the cooling passage and the connecting passages are prepared by compacting with a mold having a rising mold face corresponding thereto.

The first mode and the second mode are suitable for the case in which the cooling passage and the connecting passages are shaped to have the closed section. The second mode is advantageous in the simple process because the insert has no seam that it has no anxiety in strength or water leakage. The third mode is applied to the case in which the cooling passage and the connecting passages are shaped to have grooved section, and is advantageous in that they can be manufactured at a reasonable price by the simple process.

The present invention includes the heat absorption indexable tool using the aforementioned indexable insert. One heat absorption indexable tool is characterized by comprising a shank or holder having fluid inlet and outlet passages; an indexable type tool including an indexable insert having a plurality of corners and attached to the shank or holder; and cooling means connected to the inlet passage and the outlet passages, and is characterized: in that said indexable insert includes: a corridor-shaped cooling passage disposed inside of a plurality of corners and circulating the vicinities of the individual corners sequentially; and at least two connecting passages arranged in the end region of said cooling passage so as to communicate with said inlet passage and said outlet passage even when any of the corners is used; and in that said cooling means includes a pump for pumping a cooling fluid to the inlet passage.

Moreover, another heat absorption indexable tool of the present invention is characterized in that said cooling means includes a pump for sucking a cooling fluid from the outlet passage. In the case of this method, the indexable insert can be exemplified by that the cooling passage and the connecting passages are shaped to have the groove section, so that the tool can be manufactured at a reasonable cost.

Although the remaining features and advantages of the present invention will be described, it is apparent that the present invention should not be limited to the constructions exemplified in its embodiments so long as they are provided with the fundamental characteristics of the present invention, and that the present invention can be modified and corrected by those skilled in the art in various manners without departing from the scope thereof.

BRIEF DESCRIPTION OF THE DRAWINGS

FIG. 7-A to FIG. 7-D are top plan views schematically showing a change in the cutting point of the heat absorption indexable insert of the first embodiment and a change in the connection relation of inlet and outlet ports.

FIG. 8 is a longitudinally sectional side elevation of a portion of a second embodiment of the first mode.

FIG. 9 is an exploded perspective view.

FIG. 10 is a top plan view showing the second embodiment of the heat absorption indexable insert.

FIG. 11 is a longitudinally sectional front elevation taken along line XI—XI of FIG. 10.

FIG. 15-A to FIG. 15C are top plan views schematically showing a change in the cutting point of the heat absorption indexable insert of the third embodiment and a change in the connection relation of fluid inlet and outlet ports.

FIG. 19 is a transverse section showing a fifth embodiment of the heat absorption indexable insert.

FIG. 20 is a sectional view taken along line XX—XX of FIG. 19.

FIG. 21-A and FIG. 21-B are top plan views schematically showing a change in the cutting point of the heat absorption indexable insert of a fifth embodiment and a change in the connection relation of fluid inlet and outlet ports.

FIG. 22-A is a top plan view of a first compact for manufacturing the heat absorption indexable insert of the first mode, and FIG. 22-B is a sectional view of the same.

FIG. 23-A is a top plan view of a second compact for manufacturing the heat absorption indexable insert of the first mode, and FIG. 23-B is a sectional view of the same.

FIG. 24 is a sectional view showing the state before joined.

FIG. 41-A is a top plan view showing another example of the heat absorption indexable insert, to which the present invention is applied, and FIG. 41-B is a side elevation of the same.

FIG. 45-A is a top plan view schematically showing a relation between connecting passages and a cooling passage in a triangular insert, and FIG. 45-B is a top plan view showing the corresponding outlet and inlet of a shank or holder.

FIG. 46-A is a top plan view schematically showing a relation between connecting passages and a cooling passage in a square insert, and FIG. 46-B is a top plan view showing the corresponding outlet and inlet of the shank or holder.

FIG. 47-A is a top plan view schematically showing a relation between connecting passages and a cooling passage in an octagonal insert, and FIG. 47-B is a top plan view showing the corresponding outlet and inlet of the shank or holder.

DETAILED DESCRIPTION OF THE INVENTION

The embodiments of the present invention will be described with reference to the accompanying drawings.

[First Mode]

FIG. 1 to FIG. 7 show a heat absorption indexable insert according to the present invention and a first mode of the indexable tool having the insert applied thereto.

Figure 1:
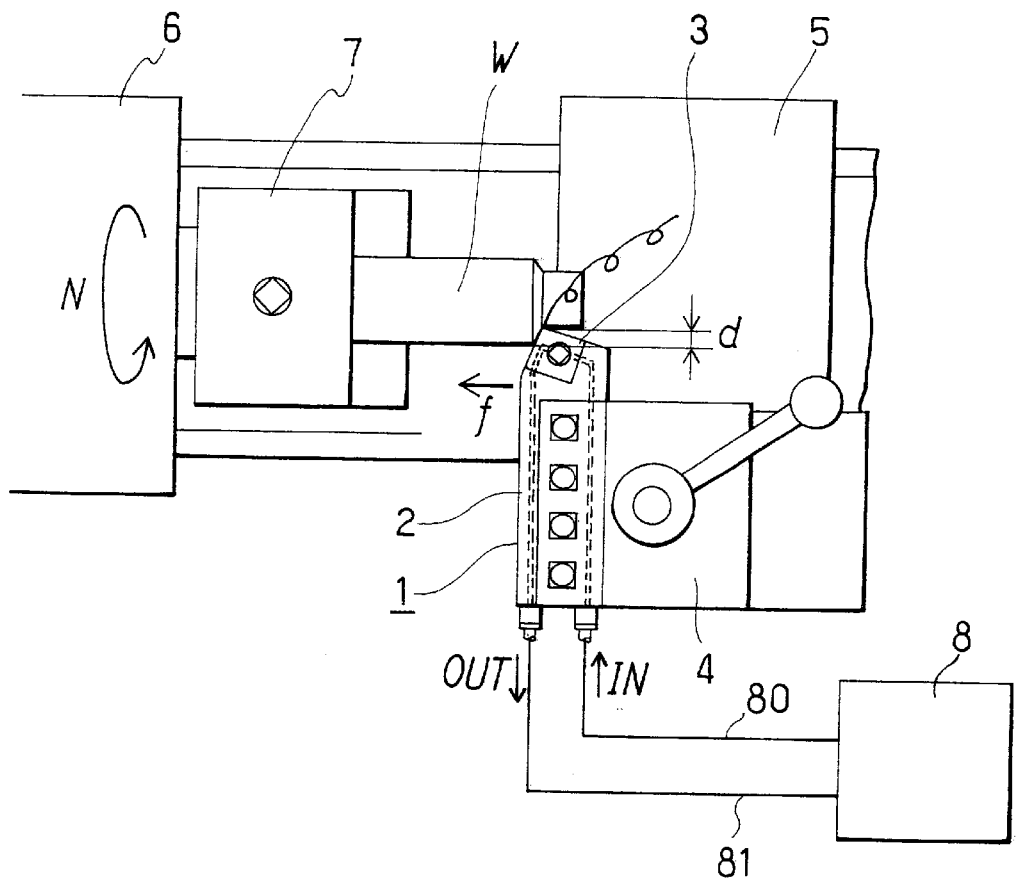
FIG. 1 is a top plan view showing a first mode of a dry cutting system constructed of a heat absorption indexable insert of the present invention and an indexable tool having the insert applied thereto.
Figure 2:
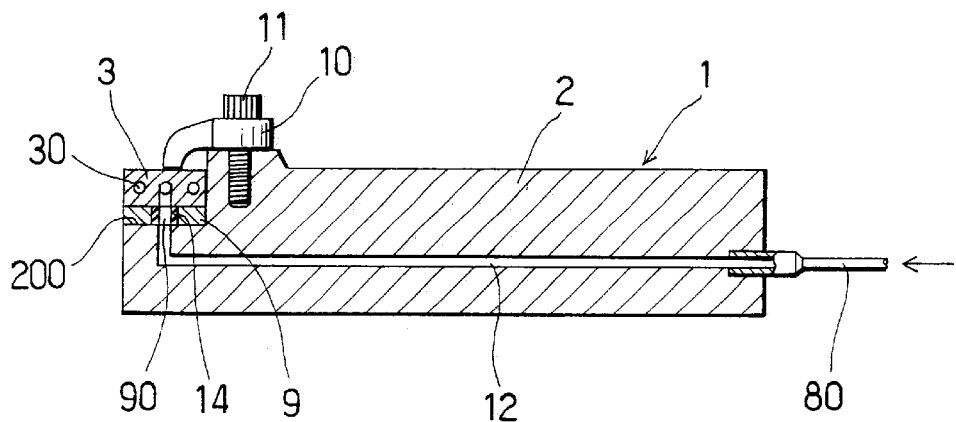
FIG. 2 is a longitudinally sectional side elevation of the indexable tool of the first mode.
Figure 3:
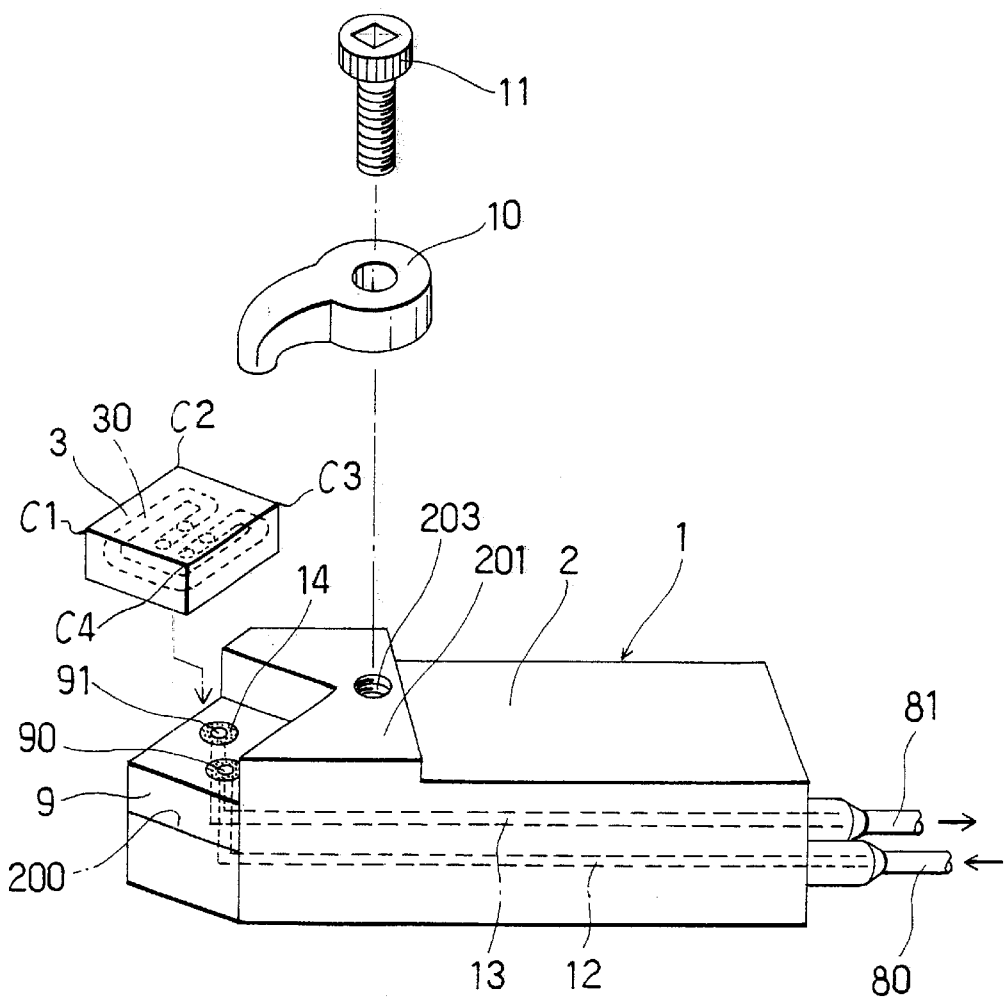
FIG. 3 is an exploded perspective view of the indexable tool of the first mode.

In FIG. 1 to FIG. 3, reference numeral 1 designates a cutting tool as the indexable tool, which includes a shank, body or holder (as will be briefly called the "shank") 2, and a heat absorption indexable insert 3 fixed replaceablly on the leading end of the shank 2.

Numeral 4 designates a tool post, to which the indexable tool 1 is attached, and which is carried on a carriage 5. Numeral 6 designates a spindle which is equipped at its leading end with a chuck 7 chucking a work W. Numeral 8 designates circulation type cooling means which is connected through conduits 80 and 81 to the indexable tool 1. This cooling means 8 is equipped with a force feed portion (or a compression pump) for a cooling fluid, and a cooling portion for cooling the cooling fluid which has absorbed a cutting heat and returned. The circulation type cooling means can be exemplified by the so-called "simple cooling unit".

The present invention does not aim principally at cooling the tool to an extremely low temperature so that the cooling fluid to be used is not restricted but can be arbitrarily exemplified by service-water, industrial water or alternate fleon.

FIG. 2 and FIG. 3 show the indexable tool 1 of FIG. 1. The shank 2 is made of a steel material used as an ordinary tool material but may be made of a material having a high thermal conductivity such as electrolytic tough pitch copper or aluminum alloy so as to improve the effect better. In this shank 2, a locating plane 200 for the heat absorption indexable insert 3 is disposed at lower portion of the leading end of the shank 2. In this example, the locating plane 200 is equipped with a seat 9 made of a carbide alloy.

On the back of the locating plane 200, there is disposed a thick pedestal 201 for mounting a clamp (or a holding member) 10 having a fixing pawl. A bolt hole 203 is formed in the center portion of the pedestal 201, and the heat absorption indexable insert 3 is mounted on the seat 9 and is fixed thereon by fastening a clamp screw 11 in the bolt hole 203.

The shank 2 is provided with an inlet passage 12 and an outlet passage 13 for the liquid, which are arranged in a relation to have no intersection with the bolt hole 203. The individual leading ends of these inlet passage 12 and outlet passage 13 reach the locating plane 200. The seat 9 is provided with an inlet port 90 and an outlet portion 91 which have communications with the respective leading end openings of the inlet passage 12 and the outlet passage 13. The inlet port 90 and the outlet port 91 are formed, in this example, by fitting cylindrical seal members 14 of an elastic material such as rubber in holes formed in the seat body.

A. First Embodiment of Heat Absorption Indexable Insert 3

Figure 4:
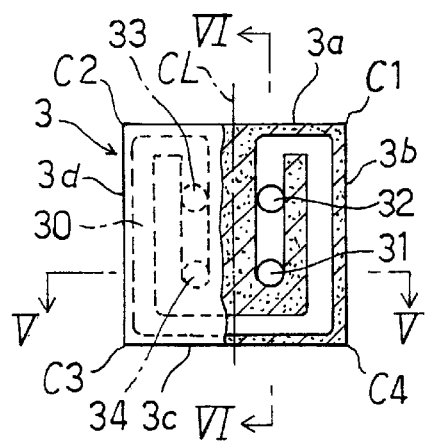
FIG. 4 is a partially cut-away top plan view of a heat absorption indexable insert of a first embodiment in the first mode.
Figure 5:
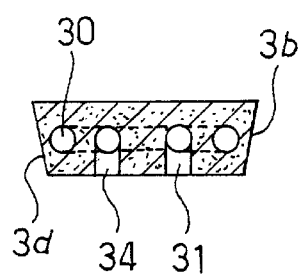
FIG. 5 is a sectional view taken along line V—V of FIG. 4.
Figure 6:
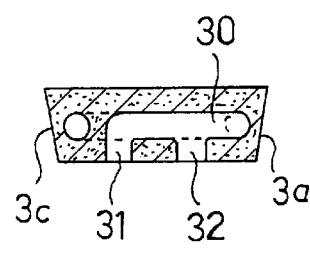
FIG. 6 is a sectional view taken along line VI—VI of FIG. 4.

FIG. 4 to FIG. 6 show the first embodiment of the heat absorption indexable insert 3 of the first mode in a single state, and FIG. 7-A to FIG. 7-D show the same in the used state. The heat absorption indexable insert 3 is made of a material selected from a carbide alloy, a variety of coating carbide alloys, thermet, ceramics, cBN or diamond.

The heat absorption indexable insert 3 is, in this example, of the positive type in which it has a square shape and in which only its one side is used. Therefore, the insert 3 has four corners C1 to C4 as cutting edges.

This insert shape per se is well known in the art, and the insert of the present invention is provided therein with a corridor-shaped cooling passage 30 for absorbing the cutting head of the corners C1 to C4 effectively. This cooling passage 30 is provided at its starting regions and terminating regions with connecting passages of the same number as that of the corners for selectively communicating with the inlet port 90 and the outlet port 91 of the seat 9.

In this embodiment, the cooling passage 30 runs along the vicinities of the individual sides, and has such curved portions near the corners C1 to C4 at the four portions as to circulate through the individual corners C1 to C4 sequentially. In order to keep the communication relation between the inlet passage 12 and the outlet passage 13 no matter what of the individual corners C1 to C4 might be used as the cutting point, four connecting passages 31, 32, 33 and 34 are equidistantly arranged at the central region of the heat absorption indexable insert 3 so that they may selectively communicate with the inlet hole 90 and the outlet hole 91.

In this embodiment, all of the cooling passage 30 and the four connecting passages 31, 32, 33 and 34 are given the closed sectional shape, i.e., the hole shape, and all the four connecting passages 31, 32, 33 and 34 are opened in the lower face of the insert, as shown in FIG. 5 and FIG. 6.

The connecting passages 31, 32, 33 and 34 are disposed, as shown in FIG. 4 on the diagonal lines joining the corners and at an equal distance from the center. Of the connecting passages 31, 32, 33 and 34, moreover, the two 31 and 32, as positioned on one side region (as located on the righthand side) which is halved across a center line CL of the sides of the insert, whereas the remaining two 33 and 34 belong to the other side region (as located on the lefthand side).

The cooling passage 30 is positioned at its one end at the first one 31 of the two connecting passages 31 and 32 belonging to one side region, and is extended across the upper end of the second passage 32 to reach the vicinity of a first insert side face 3a as shown in FIG. 4. Then, the cooling passage 30 is further extended in parallel with the first insert side face 3a and is curved from the vicinity of the corner C1 to extend in parallel with a second insert side face 3b. Moreover, the cooling passage 30 is curved from the vicinity of the corner C4 to extend in parallel with a third insert side face 3c, and is then curved from the vicinity of the corner C3 to extend in parallel with a fourth insert side face 3d. Still moreover, the cooling passage 30 is curved from the vicinity of the insert corner C2 to extend shortly in parallel with the first insert side face 3a, and intersects the third passage 33 belonging to the other side region until it finally reaches the fourth passage 34.

In the shank 2, moreover, the inlet hole 90 and the outlet hole 91 are so set in its spacing and direction (or position) that one of the third and fourth passages 33 and 34 may communicate with the outlet hole 91 when one of the first and second passages 31 and 32 communicates with the inlet hole 90.

FIG. 7-A to FIG. 7-D show the states, in which the four corners C3-C4-C1 and C2 of the heat absorption indexable insert 3 are sequentially used for the working operation, and the conduction relations of the passages at the working time, as will be described hereinafter.

B. Second Embodiment of Heat Absorption Indexable Insert 3

FIG. 8 to FIG. 11 show a second embodiment of the heat absorption indexable insert 3 of the present invention and an indexable tool having the insert applied thereto.

In this mode, the heat absorption indexable insert 3 is of the negative type using all the corners of the two sides. In this example, the surface and back of the square insert are enabled to absorb the cutting heat of totally eight corners C1 to C8.

In the heat absorption indexable insert 3, therefore, the first to fourth passages 31, 32, 33 and 34 are extended through the thickness of the insert and are opened in the upper face and the lower face of the insert, as shown in FIG. 10 and FIG. 11. The remaining constructions are similar to those of the case of the first embodiment so that their description will be omitted by designating the same portions by the common reference numerals.

In this second mode, the first to fourth passages 31, 32, 33 and 34 of the heat absorption indexable insert 3 are opened in the upper and lower insert faces. In use, therefore, a seal member 15 for sealing the openings of the passages watertight is mounted on the upper face of the heat absorption indexable insert 3, as shown in FIG. 8 and FIG. 9. The seal member 15 is prepared by adhering an elastic member 16a of rubber on an backup sheet. This seal member 15 can act as the breaker piece of the prior art.

C. Third Embodiment of Heat Absorption Indexable Insert 3

FIG. 12 to FIG. 15 show a third embodiment of the heat absorption indexable insert 3 of the present invention. This heat absorption indexable insert 3 of the third embodiment is of the positive type having a triangular shape, so that three cutting edges are formed at the three corners C1 to C3 of the upper face. The cooling passage 30 is formed into a corridor shape curved through the individual corners C1 to C3, and the connecting passages are exemplified by the four passages 31, 32, 33 and 34 intersecting the cooling passage 30. All the cooling passage 30 and the individual passages 31, 32, 33 and 34 are formed to have closed sections and are opened only in the lower face of the insert.

Of these four connecting passages, the first passage 31 is so disposed at the center of the insert, i.e., at an intersection of the perpendiculars drawn from the individual corners C1, C2 and C3 to the opposite sides that the individual corners C1, C2 and C3 may communicate with the inlet hole 90 no matter what using position they might be located. The cooling passage 30 has a starting portion 300 extending from the position of the first passage 31 to the first side face 3a. This starting portion 300 merges into the main passage at a position near the first side face 3a, and the main passage runs in parallel with the first side face 3a. The main passage is curved, when it reaches the vicinity of the corner C3, to extend in parallel with the second side face 3b. The main passage is curved, when it reaches the vicinity of the corner C2, to extend in parallel with the third side face 3c. The main passage is extended a short distance in parallel with the first side face 3a, when it reaches the vicinity of the next corner C1, and is further extended from the terminating end in parallel with the starting portion 300.

On the other hand, there are formed the three passages 32, 33 and 34 around and at an equal distance from the center of the insert, i.e., the first passage 31. These passages are arranged on lines joining the individual corners and the center. These three passages 32, 33 and 34 are intersected by such a terminating portion 301 of the cooling passage 30 as terminates at the final passage 34. The starting portion 300 and the terminating portion 301 form a shape similar to an arrow, but may have an arcuate shape.

Figure 12:
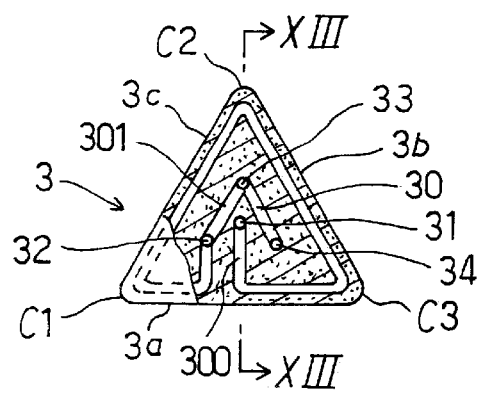
FIG. 12 is a partially cut-away top plan view showing a third embodiment of the heat absorption indexable insert.
Figure 13:
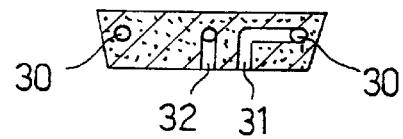
FIG. 13 is a sectional view taken along line XIII—XIII of FIG. 12.
Figure 14:
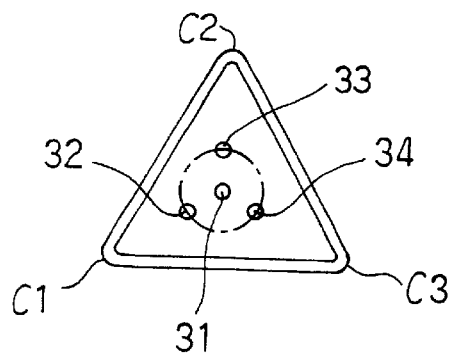
FIG. 14 is a bottom view of the third embodiment.

FIG. 15-A to FIG. 15-C show the states, in which the working operation is done by sequentially using the three corners C1-C2-C3 of the heat absorption indexable insert 3 shown in FIG. 12 to FIG. 14, and changes in the conduction relations of the passages. These Figures will be described hereinafter.

D. Fourth Embodiment of Heat Absorption Indexable Insert 3

Figure 16:
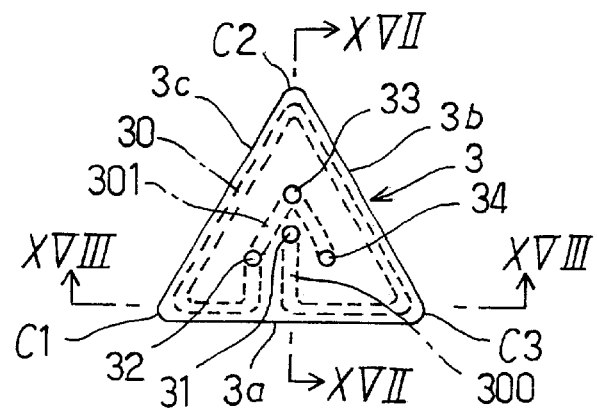
FIG. 16 is a top plan view showing a fourth embodiment of the heat absorption indexable insert.
Figure 17:
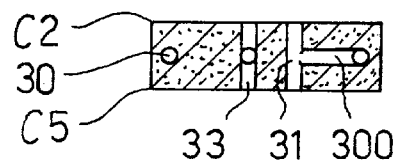
FIG. 17 is a sectional view taken along line XVII—XVII of FIG. 16.
Figure 18:
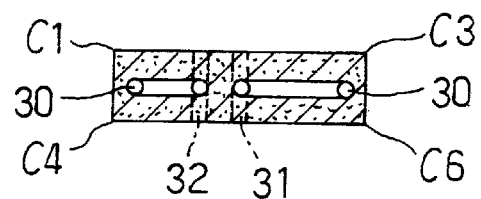
FIG. 18 is a sectional view taken along line XVIII—XVIII of FIG. 16.

FIG. 16 to FIG. 18 show a fourth embodiment of the heat absorption indexable insert 3 of the present invention. In this fourth embodiment, the insert 3 is of the negative type having a triangular shape, and totally six cutting edges are formed at the individually three corners C1 to C3 and C4 to C6 of the upper face and the lower face.

The cooling passage 30 is curved to circulate through the individual corners C1 to C6, and the four connecting passages 31, 32, 33 and 34 intersecting the cooling passage 30 are extended through the thickness of the insert and opened in the upper face and the lower face of the insert.

The remaining constructions are similar to those of the case of the third embodiment so that their description will be omitted by designating the same portions by the common reference numerals. Here in the fourth embodiment, the seal member 15, as shown in FIG. 8 and FIG. 9, is used together as the attachment element. However, this seal member 15 has a triangular planar shape corresponding to the insert shape.

E. Fifth Embodiment of Heat Absorption Indexable Insert 3

FIG. 19 to FIG. 21 show a fifth embodiment of the heat absorption indexable insert 3 of the present invention. In this embodiment, the insert 3 is of the negative type having a rhombic shape, and totally four cutting edges are formed at the individually two corners C1 to C4 of the upper face and the lower face.

The cooling passage 30 is curved to circulate through the corners C1 to C2, and C3 to C4, and the two connecting passages 31 and 32 are formed to intersect the cooling passage 30 and are opened in both the upper face and the lower face of the insert.

The first passage 31 and the second passage 32 are formed on the diagonal line joining the corners C1 and C2 and at an equal distance from the center. The cooling passage 30 to lead to the first passage 31 extends toward the first side face 3a, and runs in parallel with the first side face 3a from the vicinity of the first side face 3a. The cooling passage 30 is curved in the vicinity of the corner C1 to advance in parallel with the second side face 3b and further around the corner other than the cutting edge in parallel with the third side face 3c. The cooling passage 30 is curved at a portion near the corner C2 to extend in parallel with the fourth side face 3d and is then curved at a proper distance to lead to the second passage 32.

The remaining constructions are similar to those of the case of the foregoing other embodiments so that their description will be omitted by designating the same portions by the common reference numerals.

Here in the fifth embodiment, the seal member 15 is used together as the attachment element. However, this seal member 15 has a rhombic planar shape corresponding to the insert shape.

Here, it is quite natural that the insert 3 could include the positive type in which two cutting edges are formed at the two corners C1 and C2 of the upper face. In this modification, the first passage 31 and the second passage 32 are opened only in the lower face.

FIG. 21 shows the states, in which the working operation is done by sequentially using the two corners C1-C2 of the heat absorption indexable insert 3 of the fifth embodiment, and changes in the conduction relations of the passages. This Figure will be described hereinafter.

[Manufacture Method of Heat Absorption Indexable Insert 3 of First Mode]

1) First Mode of Manufacture Method

FIG. 22 to FIG. 24 show a first manufacture method of the heat absorption indexable insert 3 according to the present invention by exemplifying the insert of the first embodiment (of the positive type).

In this embodiment, the heat absorption indexable insert 3 is manufactured by overlapping and joining two thick halves.

Specifically, first of all, there are prepared a first compact 3A having a groove 30A halving the cooling passage 30, as shown in FIG. 22-A and FIG. 22-B, and a second compact 3B having a groove 30B halving the cooling passage 30 and the connecting passages 31, 32, 33 and 34, as shown in FIG. 23-A and FIG. 23-B. Then, the first compact 3A and the second compact 3B are overlapped, as they are, or overlapped after tentatively or completely sintered, as shown in FIG. 24. In either case, moreover, the overlapped faces are fused and joined by heating them. As a result, the cooling passage 30 acquires the closed sectional shape. After this, the integrated insert is subjected like the general-purpose indexable insert to the polishing and coating treatments to manufacture heat absorption indexable insert.

The method for acquiring the heat absorption indexable insert 3 of the second embodiment (of the negative type) is basically identical to that of the first embodiment. As shown in FIG. 23-A and FIG. 23-B, however, there are prepared two compacts 3B of the identical shape, each of which has the groove 30b halving the cooling passage 30 and the connecting passages 31, 32, 33 and 34. These connecting passages 31, 32, 33 and 34 extend through the thickness of the compact 3B. Then, these two compacts 3B and 3B sintered tentatively or completely may be overlapped and heated so that their overlapping faces may be joined. As a result, it is possible to prepare the connecting passages 31, 32, 33 and 34, as extended through the thickness and opened in the upper and lower faces, and the cooling passage 30.

In the present invention, it is needless to mention that the two first compacts 3A having the groove 30A halving the cooling passage 30, as shown in FIG. 22-A and FIG. 22-B, may be prepared so that the connecting passages 31, 32, 33 and 34 may be bored in alignment with the positions of the inlet hole 90 and the outlet hole 91 of the shank or seat to be used.

Moreover, the joint of the divided inserts should not be limited to the heating method but may be exemplified by using an adhesive, as the case may be.

2) Second Mode of Manufacture Method

FIG. 25 to FIG. 28 show another manufacture method of the heat absorption indexable insert 3 according to the present invention by exemplifying the insert of the second embodiment (of the negative type).

Figure 25:
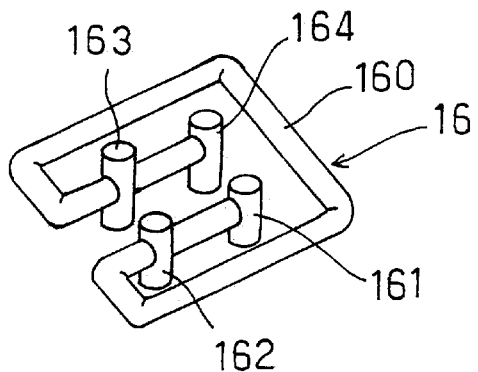
FIG. 25 is a perspective view exemplifying a core for manufacturing the heat absorption indexable insert of the first mode.

In this example, there is prepared a core 16 which corresponds to the cooling passage 30 and the connecting passages 31, 32, 33 and 34, as shown in FIG. 25. This core 16 is provided with: a corridor-shaped bar portion 160 having a size and a shape corresponding to those of the cooling passage 30; and post portions 161, 162, 163 and 164 which have a size and a shape corresponding to those of the connecting passages and which are formed to intersect the corridor-shaped bar portion 160.

This core 16 may be prepared using either a material to be gasified when heated or a material to melt at a lower temperature than the sintering temperature, by the lost wax method, the injection molding method or the stereolithography. Of these methods, the injection molding method is advantageous in the mass productivity at a reasonable cost.

As the example of the former material to be gasified when heated, there is enumerated wax or a synthetic resin. As the example of the latter material to melt at a lower temperature than the sintering temperature, there is enumerated cobalt or a low-melting alloy.

Figure 26:
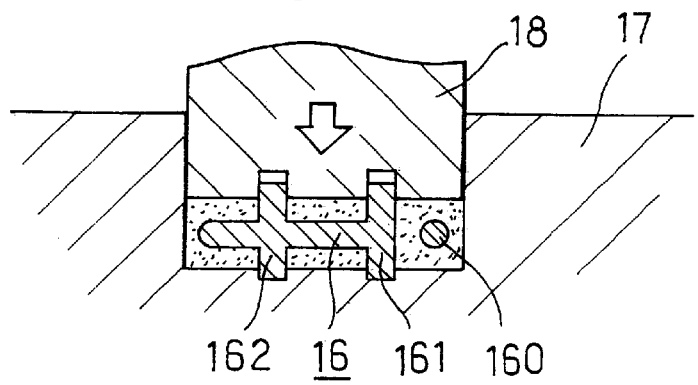
FIG. 26 is a sectional view showing a molding state.

The core 16 is inserted into the cavity of a mold 17, as shown in FIG. 26, and is fed with insert material powder to bury the core 16. Then, the core 16 is compression-molded by a punch 18. As a result, there is prepared a compact 3C having the core 16 therein. The post portions 161, 162, 163 and 164 have their end faces protruded or exposed to the upper and lower faces of the compact 3C.

Figure 27:
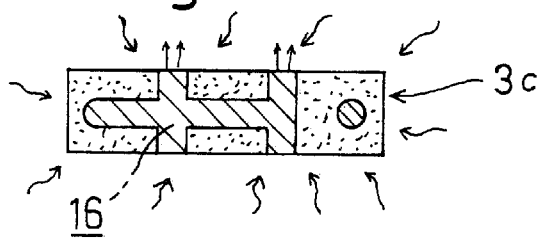
FIG. 27 is a sectional view showing a heating-sintering state.
Figure 28:
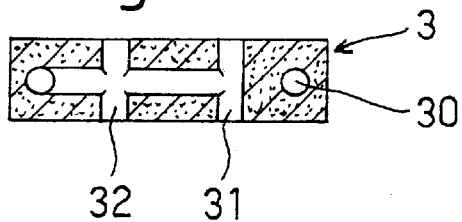
FIG. 28 is a sectional view of the completed heat absorption indexable insert.

Subsequently, this compact 3C is either tentatively and completely sintered or completely sintered according to the ordinary method, as shown in FIG. 27. At the high temperature of the sintering time, the core 16 is gasified or melted to disappear. As a result, there is provided the seamless heat absorption indexable insert which has the cooling passage 30 and the connecting passages 31, 32, 33 and 34 therein, as shown in FIG. 28.

This manufacture method is not required to prepare the two insert halves and to have the step of joining the insert halves, so that it is simple and advantageous in the freedom from anxiety of the strength, as might otherwise be caused the joint.

[Second Mode]

FIG. 29 to FIG. 34 show the heat absorption indexable insert 3 according to the present invention and a first embodiment of the second mode of the indexable tool 1 using the insert 3.

This second mode is characterized in that the cooling passage and the connecting passages for introducing and discharging the cooling fluid into and out of the cooling passage have not the closed sectional shape but a groove-shaped sectional shape. Accordingly, therefore, the circulation system of the cooling fluid is not of the type, in which the cooling fluid is pumped or forced into the insert as in the first mode, but of the type in which the cooling fluid is sucked from the insert.

Figure 29:
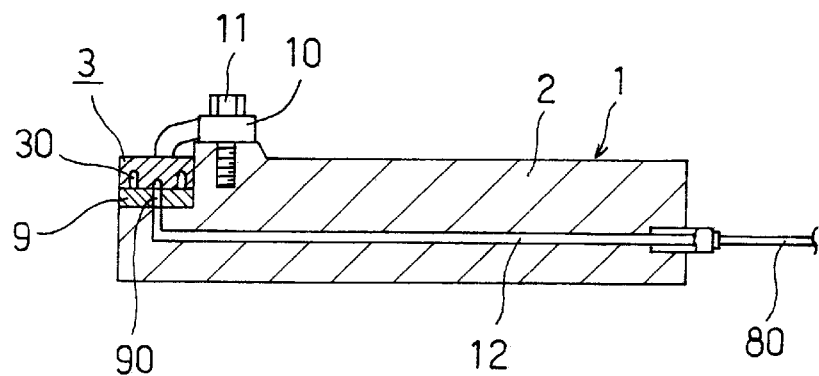
FIG. 29 is a sectional view showing a heat absorption indexable insert of the present invention and a second mode of the heat absorption indexable tool having the insert applied thereto.
Figure 30:
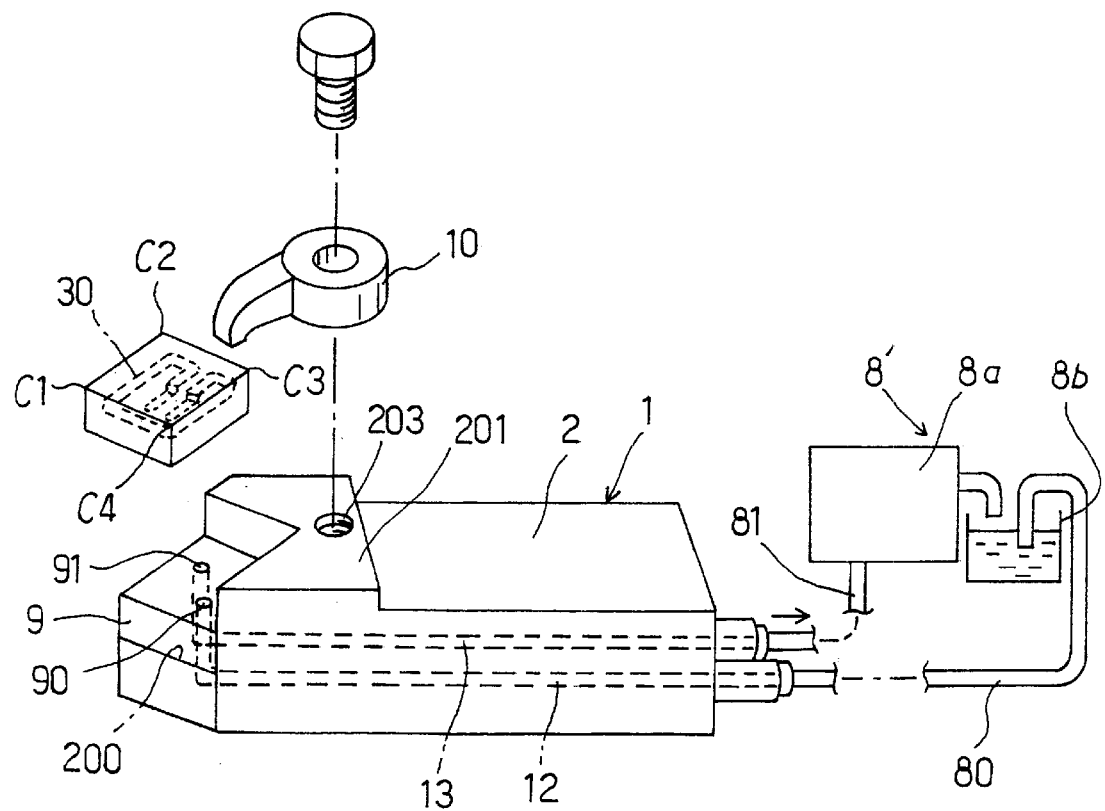
FIG. 30 is an exploded perspective view.
Figure 31:
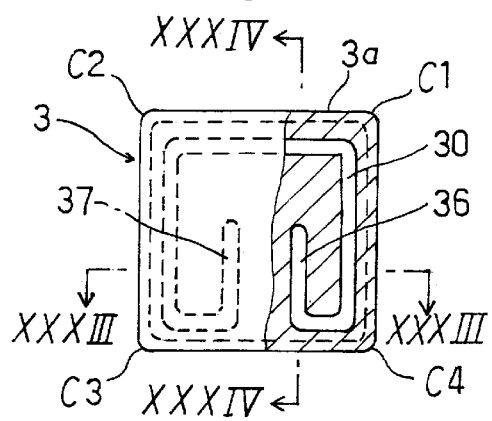
FIG. 31 is a partially cut-away top plan view showing a first embodiment of the heat absorption indexable insert of the second mode.

FIG. 29 and FIG. 30 show a basic construction. Numeral 1 designates the cutting tool as the indexable tool, which includes the shank, body or holder (as will be briefly called the "shank") 2, and the heat absorption indexable insert 3, as fixed replaceablly on the leading end of the shank 2, according to the present invention. This heat absorption indexable insert 3 is of the positive type.

In this shank 2, the locating plane 200 of the heat absorption indexable insert 3 is disposed at lower portion of the leading end of the shank 2 and is equipped with the seat 9 made of a carbide alloy.

On the back of the locating plane 200, there is disposed the thick pedestal 201 for mounting the clamp (or the holding member) 10 having a fixing pawl. The bolt hole 203 is formed in the center portion of the pedestal 201, and the heat absorption indexable insert 3 is arranged on the seat 9 and is fixed thereon by fastening the clamp screw 11, as in the first mode.

The shank 2 is provided with an inlet passage 12 and an outlet passage 13 for the liquid, which are arranged in a relation to have no intersection with the bolt hole 203. The leading ends of these inlet passage 12 and outlet passage 13 reach the locating plane 200. The seat 9 is provided with an inlet port 90 and an outlet portion 91 which have communications with the respective leading end openings of the inlet passage 12 and the outlet passage 13.

Numeral 8' designates circulation type cooling means for the cooling fluid, as connected to the indexable tool 1 through the conduits 80 and 81. The cooling means 8' is equipped with: a suction pump 8a connected with the conduit 81 leading to the outlet passage 13; and a cooling portion (or a bath 8b) for the cooling fluid discharged from the suction pump 8a. To the cooling portion 8b, there is connected the terminal of the conduit 80 which leads to the inlet passage 12.

A. First Embodiment of Heat Absorption Indexable Insert 3

FIG. 31 to FIG. 34 show a first embodiment of the heat absorption indexable insert 3 of this second mode. This insert 3 is formed into a square shape and is of the positive type, in which cutting edges are formed at the four corners C1 to C4 of the upper face.

The insert is provided, as in the first embodiment of the first mode, with the cooling passage 30 which is curved to pass near the individual corners C1 to C4. This cooling passage 30 is provided at its starting regions and terminating regions with at least two connecting passages 36 and 37 for selectively communicating with the inlet port 90 and the outlet port 91 of the seat 9.

Figure 32:
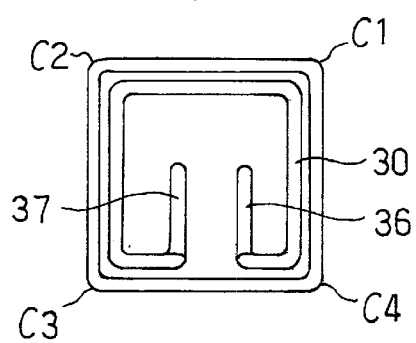
FIG. 32 is a bottom view of the first embodiment.
Figure 33:
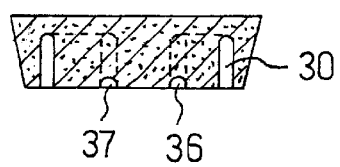
FIG. 33 is a sectional view taken along line XXXIII—XXXIII of FIG. 32.
Figure 34:
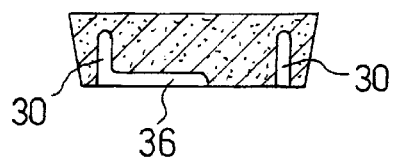
FIG. 34 is a sectional view taken along line XXXIV—XXXIV of FIG. 32.
Figure 35:
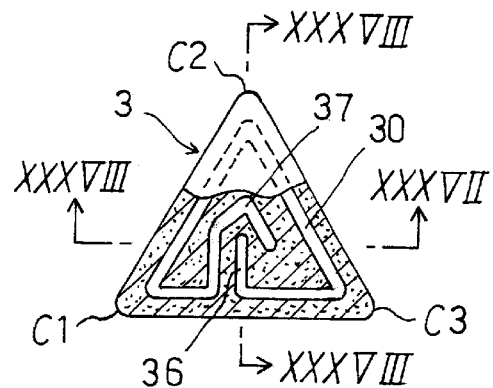
FIG. 35 is a partially cut-away top plan view showing a second embodiment of the heat absorption indexable insert of the second mode.

In this embodiment, however, the cooling passage 30 and the connecting passages 36 and 37 are formed to have groove-shaped sections and are opened in the lower face of the insert, as shown in FIG. 32 to FIG. 34.

More specifically, the cooling passage 30 planarly circulates through the four individual corners C1 to C4 sequentially. In order to communicate with the inlet hole 90 and the outlet hole 91 no matter what of the individual corners C1 to C4 might be used as the cutting edge, moreover, the heat absorption indexable insert 3 is provided with the first passage 36 on one side (as located on the righthand side), as halved across the center of the insert, and the second passage 37 on the other side (as located on the lefthand side). These first passage 36 and second passage 37 are selectively made to communicate with the inlet hole 90 and the outlet hole 91. The first passage 36 and the second passage 37 are planarly formed into the shape, in which the holed connecting passages 31, 32, 33 and 34 are eliminated from the first embodiment of the first mode. The description of the route of the cooling passage 30 is aided by that of the first embodiment of the first mode.

The cooling passage 30 is desirably thick so as to cool the individual corners C1 to C4 effectively. The first passage 36 and the second passage 37 may be as deep as the cooling passage 30 but may also be made shallower, as shown in FIG. 33 and FIG. 34, because they aim mainly at introducing and discharging the cooling fluid.

B. Second Embodiment of Heat Absorption Indexable Insert 3

FIG. 35 to FIG. 38 show a second embodiment of the heat absorption indexable insert 3 of the second mode. This insert 3 is formed into a triangular shape and is of the positive type in which the cutting edges are formed at the three corners C1 to C3 of the upper face.

Figure 36:
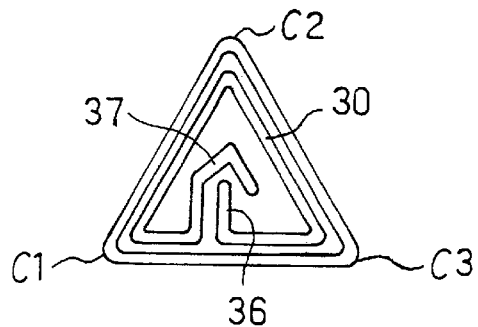
FIG. 36 is a bottom view of the second embodiment.
Figure 37:
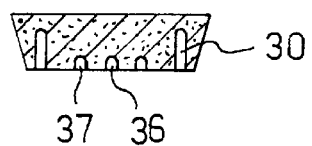
FIG. 37 is a sectional view taken along line XXXVII—XXXVII of FIG. 35.
Figure 38:
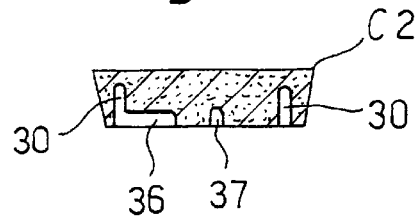
FIG. 38 is a sectional view taken along line XXXVIII—XXXVIII of FIG. 35.

In this embodiment, too, the cooling passage 30 has a groove-shaped section and is planarly curved to circulate through the individual corners C1 to C3. The cooling passage 30 is provided at its starting portion with the first passage 36 so that it may communicate with the inlet hole 90 no matter what used position any of the corners C1, C2 and C3 might take. This first passage 36 terminates at the insert center. Moreover, the cooling passage 30 is provided at its terminating end with the second passage 37 which is curved to enclose the first passage 36 equidistantly. The cooling passage 30 and the passages 36 and 37 are opened in the lower face, as shown in FIG. 36 to FIG. 38. The first passage 36 and the second passage 37 are planarly formed into the shape, in which the holed connecting passages 31, 32, 33 and 34 are eliminated from the second embodiment of the first mode.

The first passage 36 is extended from a starting end of the intersection, at which the normals are drawn from the individual corners C1, C2 and C3 to the opposite sides, to the vicinity of the first side face 3a. The second passage 37 is extended in parallel with the first passage 36 away from the first side face 3a and is formed to enclose the first passage 36 equidistantly from the substantial starting end portion of the first passage 36.

In this example, the first passage 36 and the second passage 37 are made shallower than the cooling passage 30.

The description of the route of the cooling passage 30 is aided by that of an identical one of the third embodiment of the first mode.

B. Third Embodiment of Heat Absorption Indexable Insert 3

Figure 39:
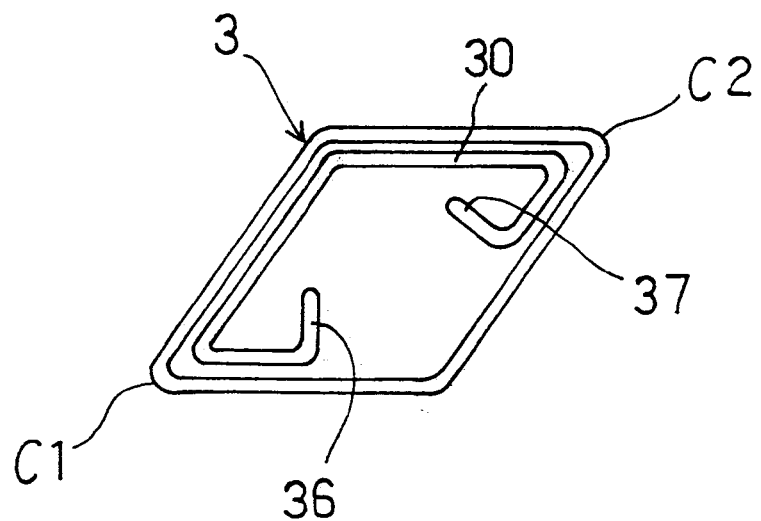
FIG. 39 is a bottom view showing a third embodiment of the heat absorption indexable insert of the second mode.

FIG. 39 shows a third embodiment of the second mode. This embodiment shows the rhombic positive type, in which the cutting edges are formed at the two corners C1 and C2 of the upper face.

In this embodiment, too, the cooling passage 30 is formed to have a groove-shaped section and is planarly curved to circulate through the individual corners C1 and C2. No matter what of the used positions the two corners C1 and C2 might take, the cooling passage 30 is provided at its starting end portion with the first passage 36 having a groove-shaped section to communicate with the inlet hole 90 and at its terminating end portion with the second passage 37 having a groove-shaped section to communicate with the outlet hole 91.

The description of the planar shape of the cooling passage 30 is aided by that an identical one of the third embodiment of the first mode.

[Manufacture Method of Heat Absorption Indexable Insert 3 of Second Mode]

Figure 40:
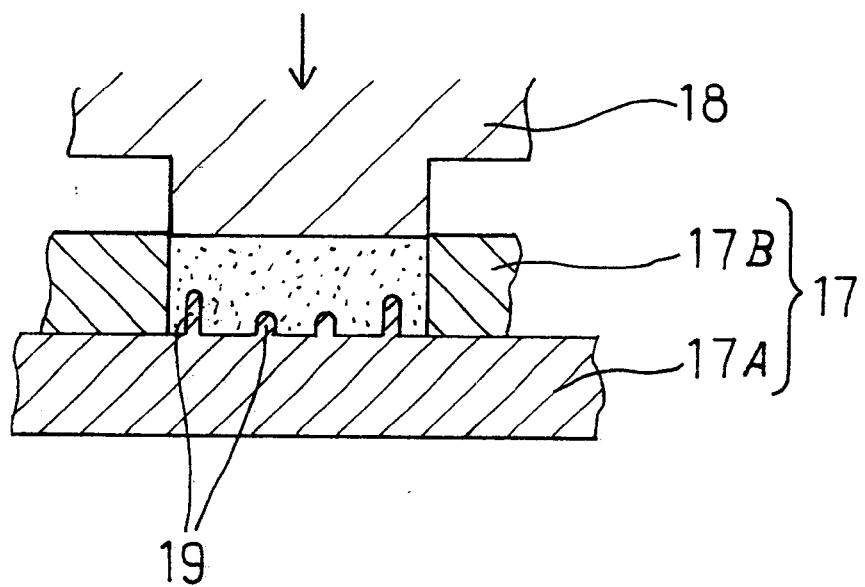
FIG. 40 is a sectional view showing the molding state of the heat absorption indexable insert of the second mode.

FIG. 40 shows a manufacture method of the heat absorption indexable insert 3 of the second mode. On the cavity bottom of the mold 17 composed of a bottom part 17A and a core part 17B, there is placed a male mold 19 which corresponds to the shapes and sizes of the cooling passage 30, the first passage 36 and the second passage 37, as exemplified in the foregoing embodiment. The insert material powder is fed to the inside of the cavity and is compression molded by the punch 18. As a result, there is prepared the compact which is provided with the cooling passage 30, the first passage 36 and the second passage 37, as has been exemplified in the embodiments of the second mode. After this, the heat absorption indexable insert 3 is manufactured by sintering the compact either tentatively and completely or completely according to the ordinary method.

The cooling passage 30, the first passage 36 and the second passage 37 of the second mode are formed to have the groove-shaped section opened in the lower face of the insert. Therefore, the mold can be easily prepared by the simple process so that this manufacture method is advantageous in the low cost.

[Other Modes of the Invention]

The present invention should not be limited to the embodiments thus far described but can be modified and applied in various manners.

1) The shape of the heat absorption indexable insert should not be limited to the triangle or square but include a polygon such as a pentagon, hexagon or octagon, a rectangle or a parallelogram. Moreover, the heat absorption indexable insert 3 of the present invention can also be applied to a cutting-off insert and to a re-grounding type indexable insert.

2) The heat absorption indexable insert 3 covers not only the flat type but also one having the breaker groove.

3) The sectional shape of the cooling passage 30 should not be limited to the circular shape but is arbitrary, as exemplified by a square. Where the insert is of the negative type, moreover, the cooling passage 30 may be given a structure in which it is branched from the main passage to correspond the upper and lower corners and is connected again over the corners to the main passage.

4) The fixing of the insert should not be limited to the clamp-on method but may be a cam-lock type or a screw-on type. In this screw-on case, the cooling passage may be formed to avoid an eccentric shaft or screw. In the screw-on case, moreover, the insert may be made of a composite sintered material with a material having a high thermal conductivity.

5) The heat absorption indexable insert 3 of the present invention covers one having an insert body and a hard insert. This example is shown in FIG. 41-A and FIG. 41-B. Numeral 302 designates a carbide pedestal, and numeral 303 designates a hard insert member such as a diamond insert or cBN insert soldered to a bearing surface 304 of the carbide pedestal 302. This carbide pedestal 302 is provided with the cooling passage 30 and at least two connecting passages, as has been exemplified in the aforementioned embodiments, and the cooling passage 30 partially circulates just below the bearing surface 304.

6) The tool according to the present invention should not always be limited to the case using the seat 9. Specifically, the inlet hole 90 and the outlet hole 91 may be formed directly in the locating plane 200 of the shank, and the heat absorption indexable insert may be mounted and fixed directly on the locating plane 200.

7) The tool, to which the heat absorption indexable insert according to the present invention is applied, should not be limited to the irrotational indexable tool.

Figure 42:
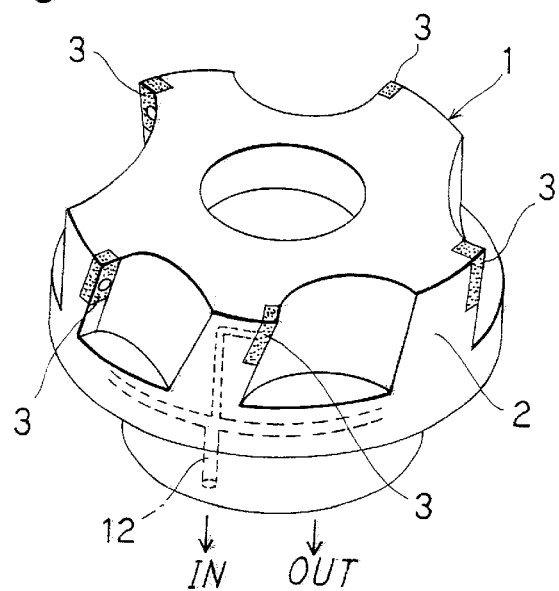
FIG. 42 is a perspective view showing another example of the indexable tool, to which the present invention is applied.
Figure 43:
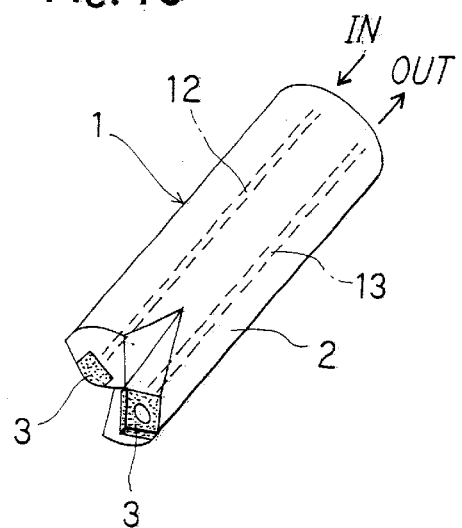
FIG. 43 is a perspective view showing another example of the indexable tool, to which the present invention is applied.

FIG. 42 shows an indexable milling cutter as a rotary type tool, to which the heat absorption indexable insert 3 of the present invention is applied. FIG. 43 shows an indexable drill as a rotary type tool, to which the heat absorption indexable insert 3 of the present invention is applied.

Either of these tools is constructed to include the shank 2 and the heat absorption indexable insert 3. The shank 2 is provided with the inlet passage 12 and the outlet passage 13, which lead at one end to the outside and at the other end to the locating plane of the heat absorption indexable insert 3. These passages are connected to the not-shown circulation type cooling means.

Figure 44:
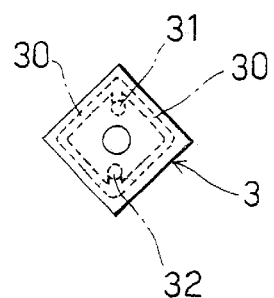
FIG. 44 is a top plan view showing an example of the heat absorption indexable insert to be used in the tools of FIG. 42 and FIG. 43.

FIG. 44 shows one example of the heat absorption indexable insert 3. In order that this insert 3 may be fixed by the cam lock type, the screw-on type or the wedge-lock type, the passages 31 and 32 are formed at positions on diagonal lines avoiding the center hole and are connected to the cooling passage 30.

Here, the inlet passage 12 and the outlet passage 13 may be formed at each heat absorption indexable insert or may be given a passage structure in which they are branched from the main passage.

The present invention can also be applied to all plastic working indexable tool such as a drawing die or a shaving tool.

8) In the foregoing embodiments, the example having one connecting passage formed at the insert center is exemplified by the triangular insert, but this shape can be applied to all other polygonal inserts.

FIG. 46-A and FIG. 46-B show an example, in which the present invention is applied to a square insert, and a corresponding shank. This insert is provided with the first passage 31 at its center and with four passages 32, 33, 34 and 35 on the diagonal lines joining the four corners and at positions of an equal distance from the center. The terminating portion 301 of the cooling passage 30 intersects the four passages 32, 33, 34 and 35 and terminates at the final passage 35. The shank 2 is provided with the inlet hole 90 at a position corresponding to the first passage 31 and with the outlet hole 91 at a position at a distance corresponding to a distance 1 between the first passage 31 and the second passage 32 and on the diagonal lines of the locating plane.

FIG. 47-A and FIG. 47-B show an example, in which the present invention is applied to an octagonal insert, and a corresponding shank. This insert is provided with the first passage 31 at its center and with eight passages, 32, 33, 34, 35, 36, 37, 38 and 39 on the diagonal lines joining the eight corners and at positions of an equal distance from the center.

Here will be described the actions of the embodiments of the present invention.

In the first embodiment and the second embodiment of the first mode, for the cutting work, the conduits 80 and 81 from the circulation type cooling means are connected by couplers to the inlet passage 12 and the outlet passage 13 of the shank 2, respectively. Then, the carriage 5 is moved, and the tool post 4 is moved to attain a desired depth of cut. The cooling means 8 is activated to feed the cooling fluid to the shank 2 and the heat absorption indexable insert 3, and the cutting operation is done while returning the cooling fluid to the cooling means 8.

Then, the cooling fluid passes through the inlet passage 12 of the shank 2, the inlet hole 90 and the connecting passages and flows through the cooling passage 30 of the heat absorption indexable insert 3. This cooling passage 30 is formed to circulate through the corners acting as the cutting edges, and the cutting heat generated at the cutting point is absorbed by the cooling fluid flowing through the cooling passage 30 so that the temperature at the cutting point is lowered by the heat exchange. The cooling fluid thus heated is absorbed by the shank 2 of the high thermal conductivity while flowing from the connecting passages through the outlet hole 91 and the outlet passage 13 and is carried to the outside. The cooling fluid is cooled to a predetermined temperature by the cooling means 8 and is fed again to the cooling passage 30 through the shank 2. Here is constructed the heat absorption circulation system.

By this heat absorption of the cutting heat into the indexable insert, therefore, the heat releasing rate can be enhanced to reduce the wear of the corners or cutting edges drastically. As the conventional cutting method, there is the low temperature cutting method, by which the cutting operation is done with the tool (or shank) or work being cooled to an extremely low temperature of about −40° C. with liquid nitrogen. This method aims principally at what a low temperature the cutting point is set. This is conceptionally different from the present invention which aims principally at absorbing and releasing the cutting heat from the inside of the tool by enhancing the heat absorption rate of the tool itself. The present invention has an excellent merit that it can be practiced at the low cost because it requires no medium at an extremely low temperature. When the cutting operation is done at the corner C3, as shown in FIG. 7-A, according to the first embodiment of the first mode, the first passage 31 belonging to one side region of the connecting passages communicates with the inlet hole 90, whereas the third passage 33 belonging to the other side region communicates with the outlet hole 91. The second and fourth passages 32 and 34 are closed by having their individual openings in close contact with the locating plane 200.

When the cutting operation proceeds so that the corner C3 is worn out, the heat absorption indexable insert 3 is removed and is turned by 90 degrees so that it is fastened and fixed on the shank 2. As shown in FIG. 7-B, the corner C4 is directed to the work, and the second passage 32 communicates with the inlet hole 90 whereas the fourth passage 34 communicates with the outlet hole 91 so that the fluid having passed through the cooling passage 30 passes and cools the vicinity of the corner C4.

When the corner C4 is worn out, the heat absorption indexable insert 3 is turned to direct the corner C1 to the work, as shown in FIG. 7-C. At this time, the third passage 33 communicates with the inlet hole 90, and the first passage 31 communicates with the outlet hole 91.

When the corner C1 is worn out, the heat absorption indexable insert 3 is likewise turned to bring the corner C2 to the work, as shown in FIG. 7-D. Then, the fourth passage 34 communicates with the inlet hole 90, and the second passage 32 communicates with the outlet hole 91.

According to the present invention, therefore, the heat absorption system conforming to a change in the cutting point can be constructed easily and promptly without any special means so that this mode can meet the wears of the four corners.

In the second embodiment of the first mode, the individual connecting passages 31, 32, 33 and 34 of the heat absorption indexable insert 3 reach the upper and lower faces of the insert. By attaching the heat absorption indexable insert 3 upside-down to the shank 2 after the operations of FIG. 7-A to FIG. 7D, the heat can be efficiently absorbed from all the eight corners (i.e., the four corners on the surface side and the four corners on the back side).

In this case, the two connecting passages having no communication with the inlet hole 90 and the outlet hole 91 are closed by contacting with the locating plane 200, and the four passage openings leading to the surface or backside unused are sealed liquid-tight by the seal member 15.

The actions thus far described are identical to those of the cases of the indexable milling cutter and the indexable drill.

In the third embodiment of the first mode, when the cutting operation is done with the corner C1, as shown in FIG. 15-A, the first passage 31 at the insert center communicates with the inlet hole 90, and the third passage 33 communicates with the outlet hole 91. The second and fourth passages 32 and 34 are closed by having their individual openings in close contact with the locating plane 200. Therefore, the fluid passes through the cooling passage 30 to cool the vicinity of the corner C1.

When the cutting operation proceeds so that the corner C1 is worn out, the heat absorption indexable insert 3 is removed and is turned by 120 degrees to direct the corner C2 to the work, as shown in FIG. 15-B, so that it is fastened and fixed on the shank 2. Thus, the first passage 31 is positioned at the center of the insert to keep the communication with the inlet hole 90, and the fourth passage 34 communicates with the outlet hole 91 so that the fluid having passed through the cooling passage 30 passes through and cools the vicinity of the corner C2.

Next, when the corner C2 is worn out, the heat absorption indexable insert 3 is turned to direct the corner C3 to the work, as shown in FIG. 15-C. At this time, too, the first passage 31 communicates with the inlet hole 90, and the second passage 32 communicates with the outlet hole 91.

Therefore, the heat absorption system meeting the change in the cutting point can be constructed simply and promptly without any special means.

In the fourth embodiment of the first mode, by attaching the heat absorption indexable insert 3 upside-down to the shank 2 after the operations of FIG. 15-A to FIG. 15-C, the heat can be efficiently absorbed from all the six corners (i.e., the three corners on the surface side and the three corners on the back side).

In the fifth embodiment of the first mode, when the cutting operation is done with the corner C1, as shown in FIG. 21-A, the first passage 31 communicates with the inlet hole 90, and the second passage 32 communicates with the outlet hole 91. Therefore, the fluid passes through the cooling passage 30 to cool the vicinity of the corner C1.

When the cutting operation proceeds so that the corner C1 is worn out, the heat absorption indexable insert 3 is removed and is turned by 180 degrees to direct the corner C2 to the work, as shown in FIG. 21-B, so that it is fastened and fixed on the shank 2. Thus, the second passage 32 communicates with the inlet hole 90, and the second passage communicates with the outlet hole 91, so that the fluid having passed through the cooling passage 30 passes and cools the vicinity of the corner C2.

In this embodiment, too, therefore, the heat absorption system meeting the change in the cutting point can be constructed simply and promptly without any special means.

Where the insert of the fifth embodiment of the first mode is of the negative type, the heat absorption indexable insert 3 is attached upside-down to the shank 2 so that the heat can be efficiently absorbed from all the four corners (i.e., the two corners on the surface side and the two corners on the back side).

In the second mode of the present invention, the heat absorption indexable insert 3 is attached such that the first passage 36 and the second passage 37, as groove-shaped and opened in the lower face, may communicate with the inlet hole 90 and the outlet hole 91 of the shank 2 or the seat 9. As the result, the insert lower face open side of the groove-shaped cooling passage 30 is closed by contacting with the locating plane 200 or the seat 9 thereby to provide the closed sectional shape.

In this state, the cooling means 8' is activated to feed the cooling fluid to the shank 2 and the heat absorption indexable insert 3, and the cutting operation is done while returning the cooling fluid to the cooling means 8'. In the second mode, the suction pump 8a is used to construct the heat absorption circulation system, in which the cooling fluid of the cooling passage 30 is discharged through the second passage 37 (or the first passage 36)—the outlet hole 91—the outlet passage 13 by the sucking force of the suction pump 8a, and in which the cooling fluid discharged to the cooling portion 8b is sucked by the vacuum through the cooling portion 8b—the inlet passage 12—the inlet hole 90 and further through the first passage 36 (or the second passage 37) to the cooling passage 30. This cooling passage 30 is formed to run around the corner acting as the cutting edge so that the cutting heat generated at the cutting point is absorbed by the fluid of the cooling passage 30 of the heat absorption indexable insert 3.

In the second mode, the cooling fluid is neither pumped nor forced, no high pressure is applied to the inlet hole 90 so that the seal for preventing the leakage from the inlet hole 90 and the outlet hole 91 can be omitted to provide a simpler tool.

The heat absorption indexable insert is crushed, when used out, for reuse of its material. In any of the embodiments, the heat absorption indexable insert 3 is given a hollow structure by the cooling passage 30 and the connecting passages so that it has a merit of easy crush.

Here, the present invention can be used with the ordinary wet cutting method, or another environmental MQL cutting method, cold-air blast cutting method or nitrogen blast cutting method. Then, it is possible to expect the synergetic effect of the two methods.

Here are presented the results of manufacturing the heat absorption indexable insert actually according to the present invention and performing the cutting tests.

The shank was made of electrolytic tough pitch copper (having a thermal conductivity of 0.93 cal/cm·sec·° C. at 20° C.) and the heat absorption indexable insert was made of a sintered carbide alloy (M20) of a square type having a thickness of 4 mm and sides of a length of 12 mm.

The cooling passage of this heat absorption indexable insert was given a construction shown in FIG. 10 and FIG. 11. The cooling passage had a section of 2 mm $\phi$, as taken at a right angle with respect to the longitudinal direction. This heat absorption indexable insert was manufactured by preparing two compact halves, by overlapping the compact halves after tentatively sintered, and by overlapped halves completely, as shown in FIG. 22 to FIG. 24.

The inlet and outlet passages of the shank were given a diameter of 2 mm in sections normal to the longitudinal direction. The circulation type cooling means was exemplified by a simplified cleaning device and was fed with service-water of 5° C. at a rate of 10 to 15 l/min.

For the working operations, an ordinary 3-feet lathe was used to machine the outer circumference of the work of S45C longitudinally. The cutting speed was 100 m/min.; the depth of cut was 0.5 mm; and the feed was 0.5 mm/rev. No lubricant was used.

For comparisons, there was used the indexable inserts which was made of a sintered carbide alloy to have the same sizes as those of the aforementioned tool. The shank made of steel was used to perform the conventional dry cutting operation at the aforementioned cutting speed, depth of cut and feed.

For comparisons, moreover, a pipe was extended through the shank at a right angle with respect to the longitudinal direction and was fed with cooling water. In the indexable insert, there was also used a comparison indexable tool which was prepared by fitting the electrolytic tough pitch copper ring on the center of a screw type sintered carbide alloy. The machining operations were performed under the same conditions as the aforementioned ones.

Figure 48:
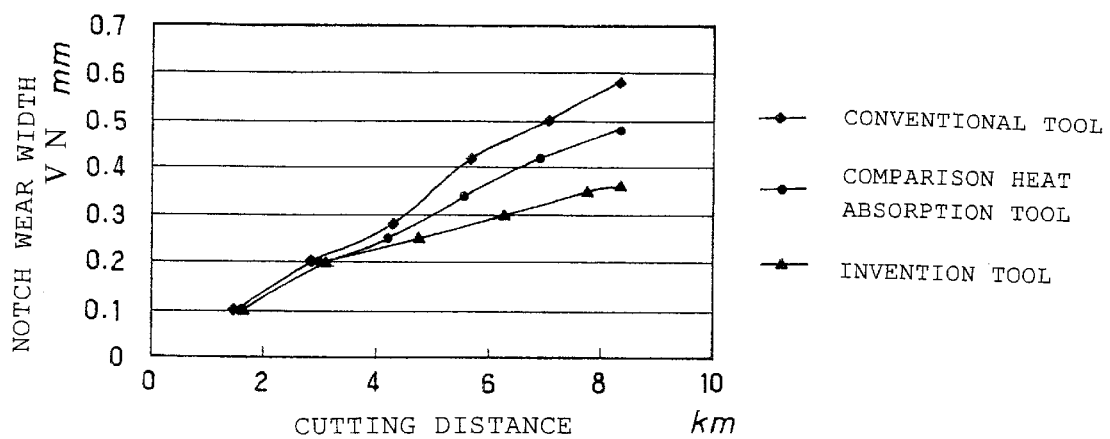
FIG. 48 is a graph comparing relations between a notch wear width and a cutting distance at the time when cutting tests were made using the heat absorption indexable insert and tool of the present invention, with a conventional tool and a comparison tool.

The relations measured between the cutting distance and the notch wear width are presented in FIG. 48. Moreover, the relations measured between the cutting distance and the flank wear width are presented in FIG. 49.

Figure 49:
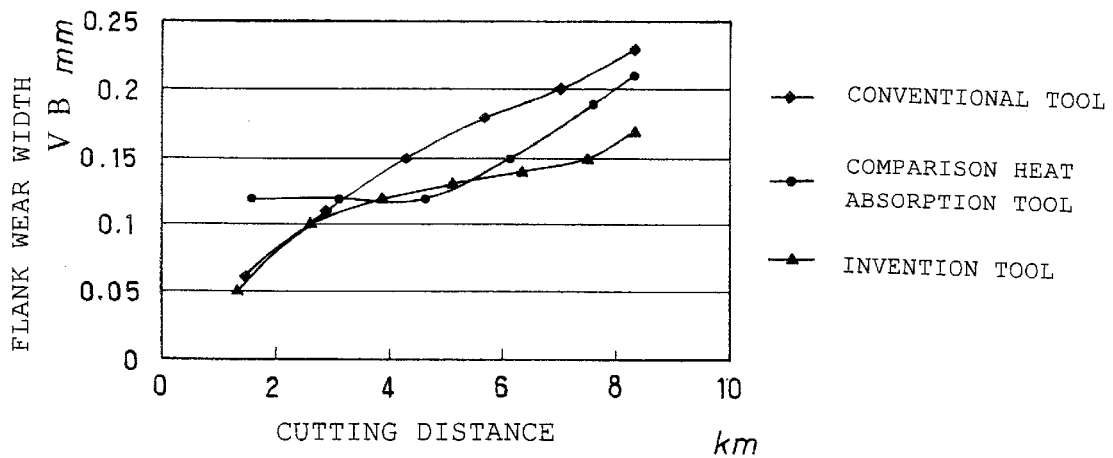
FIG. 49 is a graph comparing relations between a flank wear width and a cutting distance at the time when the cutting tests were made using the heat absorption indexable insert and tool of the present invention, with a conventional tool and a comparison tool.

From these FIG. 48 and FIG. 49, it is found that the wear due to the cutting heat could be drastically reduced to about 50% as high as that of the conventional cutting case, because the tool of the present invention had a remarkably high heat absorption efficiency. As compared with the comparison indexable tool in which the shank but not the heat absorption indexable insert was fed with water, moreover, it is found that the wear due to the cutting heat could be reduced to about 70%.

In order to confirm these, the edge temperatures were analyzed by the FEM. As a result, it is confirmed that the edge temperature could be halved, as compared with that of the dry cutting operation. From this, it is apparent that the cutting heat could be reduced by enhancing the heat absorption effect of the cutting edge.

Experiments were conducted for comparisons with another cooling means. The comparison cooling means is enumerated, as follows.

A. (Conventional Tool/Wet Type):

The conventional tool was used, and the cutting point was fed with a chlorine-free cutting fluid (as commercially available as the "Eco-Cut 605E" of Fuchs GmbH).

B. (Conventional Tool/Minimum Quantity Lubrication):

The conventional tool was used, and the cutting point was fed with a blow of mist of Plant-Cut of Fuchs GmbH under the conditions of 3 ml/h. at 23° C.

C. (Conventional Tool/Cold-Air Blast Cutting):

The conventional tool was used, and the cutting point was fed with a blow of air (at −10° C.).

Figure 50:
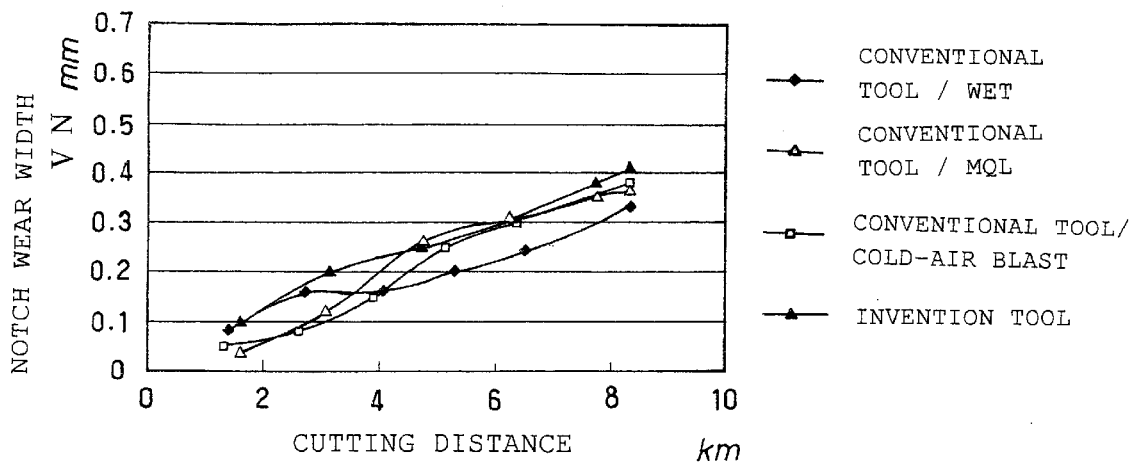
FIG. 50 is a graph plotting relations of the conventional method between the notch wear width and the cutting distance at the time when the cutting tests were made using the heat absorption indexable insert and tool of the present invention.
Figure 51:
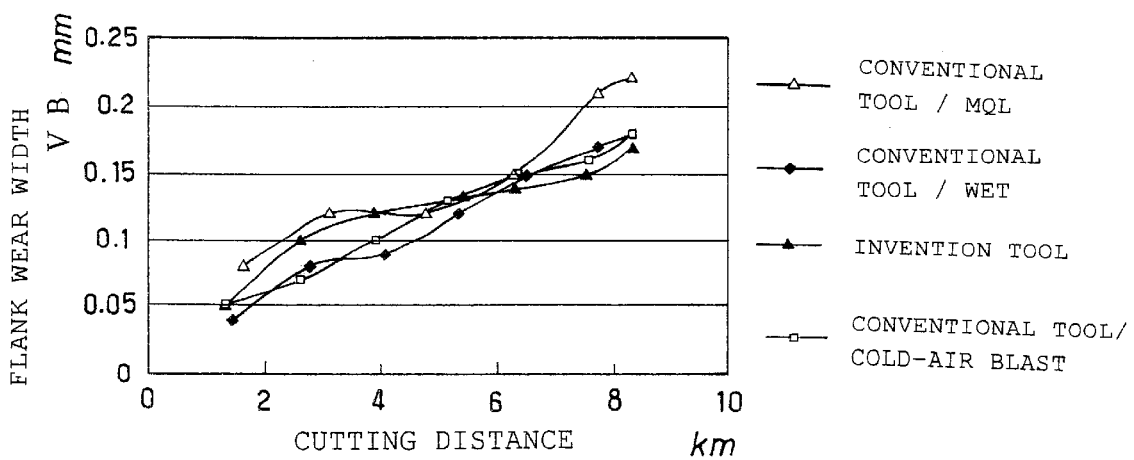
FIG. 51 is a graph plotting relations of the conventional method between the flank wear width and the cutting distance at the time when the cutting tests were made using the heat absorption indexable insert and tool of the present invention.

The results of the relations measured between the cutting distance and the notch wear width are presented in FIG. 50. Moreover, the results of the relations measured between the cutting distance and the flank wear width are presented in FIG. 51.

As apparent from these Figures, it is found that the present invention could achieve the results substantially equivalent to those of the conventional tool/the cold-air blast cutting method, about 80% as high as those of the conventional tool/the MQL cutting method, and substantially equivalent to those of the conventional tool/the wet type.

Figure 52:
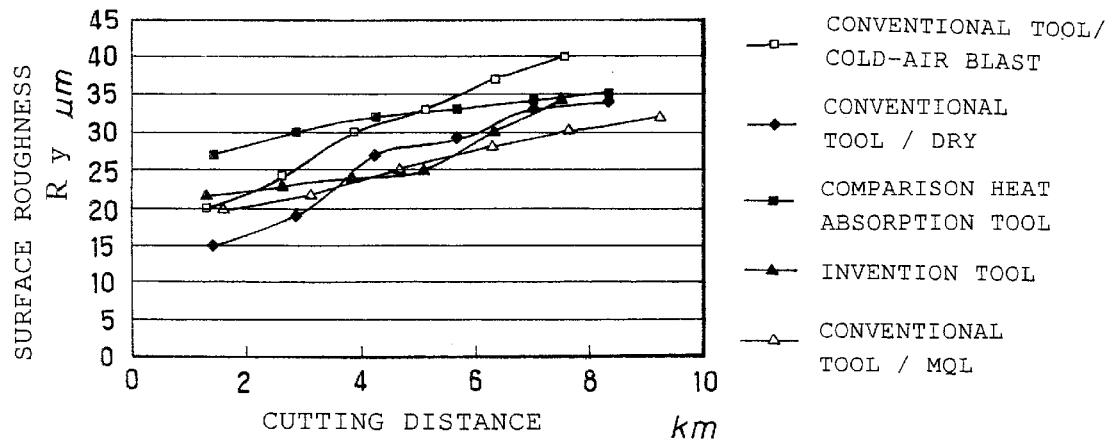
FIG. 52 is a graph plotting relations of the conventional method between the surface roughness and the cutting distance at the time when the cutting tests were made using the heat absorption indexable insert and tool of the present invention.

The results of the relations measured between the cutting distance and the surface roughness are presented in FIG. 52. From this Figure, it is found that the tool and system of the present invention can realize the satisfactory surface roughness although they are of the dry type.

INDUSTRIAL APPLICABILITY

The present invention can be utilized generally in an indexable cutting tool using an indexable insert such as a cutting tool, a face milling cutter, an end milling cutter or a drilling machine.

What is claimed is:

1. In an indexable insert to be attached, when used, to a shank or holder having fluid inlet and outlet passages,
a heat absorption indexable insert comprising: a corridor-shaped cooling passage disposed inside of a plurality of corners and circulating the vicinities of the individual corners sequentially; and a connecting passage arranged in an end portion region of said cooling passage so as to communicate with said inlet passage and said outlet passage even when any corner is used.

2. A heat absorption indexable insert as set forth in claim 1, wherein said cooling passage and said connecting passage are individually formed to have closed sectional shapes.

3. A heat absorption indexable insert as set forth in claim 2, wherein said indexable insert is of a positive type, and wherein the connecting passage is opened only in the lower face of the insert.

4. A heat absorption indexable insert as set forth in claim 2, wherein said indexable insert is of a negative type, wherein the connecting passage is extended through the insert in the thickness direction, and wherein the opening of the connecting passage in an upper face side is closed at a using time with a seal member.

5. A heat absorption indexable insert as set forth in claim 1, wherein the cooling passage and the connecting passage are individually formed into groove-shaped sectional shapes having openings in the insert lower face.

6. A heat absorption indexable insert as set forth in claim 2, wherein the connecting passages are disposed on diagonal lines joining the corners to be used as the cutting edges of a polygonal indexable insert and at positions equidistant from the insert center, wherein the connecting passages belonging to one side region halved from the center of the sides of the insert communicate with one end portion of the cooling passage whereas the connecting passages belonging to the other side region communicate with the other end portion of the cooling passage, and wherein one of the connecting passages belonging to one of the regions functions as an inlet passage whereas the connecting passages belonging to the other region function as an outlet passage.

7. A heat absorption indexable insert as set forth in claim 6, wherein the indexable insert has a square shape, and wherein the connecting passages are four in number.

8. A heat absorption indexable insert as set forth in claim 2, wherein the single connecting passage is disposed at the center of a polygonal indexable insert, wherein connecting passages are disposed on straight lines joining the individual corners to be used as cutting edges and said center and at positions equidistant from the center, wherein the center connecting passage communicates with one end portion of the cooling passage whereas the remaining connecting passages communicate with the other end portion of the cooling passage, and wherein the center connecting passage functions as the inlet passage at all times whereas the other connecting passages around the center one function as the outlet passages.

9. A heat absorption indexable insert as set forth in claim 1 wherein the cooling passage and the connecting passages are prepared by laminating and joining two halved inserts having grooves.

10. A heat absorption indexable insert as set forth in claim 1, wherein the cooling passage and the connecting passages are prepared by causing a core having a shape corresponding thereto to disappear at the time of sintering a compact.

11. A heat absorption indexable insert as set forth in claim 1, wherein the cooling passage and the connecting passages are prepared by compacting with a mold having a rising mold face corresponding thereto.

12. A heat absorption indexable tool comprising: a shank or holder having fluid inlet and outlet passages; an indexable type tool including an indexable insert having a plurality of corners and attached to the shank or holder; and cooling means connected to the inlet passage and the outlet passages, wherein said indexable insert includes: a corridor-shaped cooling passage disposed inside of a plurality of corners and circulating the vicinities of the individual corners sequentially; and at least two connecting passages arranged in the end region of said cooling passage so as to communicate with said inlet passage and said outlet passage even when any of the corners is used, and wherein said cooling means includes a pump for pumping a cooling fluid to the inlet passage.

13. A hear absorption indexable tool comprising: a shank or holder having fluid inlet and outlet passages; an indexable type tool including an indexable insert having a plurality of corners and attached to the shank or holder; and cooling means connected to the inlet passage and the outlet passages, wherein said indexable insert includes: a corridor-shaped cooling passage disposed inside of a plurality of corners and circulating the vicinities of the individual corners sequentially; and at least two connecting passages arranged in the end region of said cooling passage so as to communicate with said inlet passage and said outlet passage even when any of the corners is used, and wherein said cooling means includes a pump for sucking a cooling fluid from the outlet passage.

* * * * *